Oct. 10, 1944.    G. A. WAHLMARK    2,360,025
TRANSMISSION
Filed June 5, 1941    10 Sheets-Sheet 1
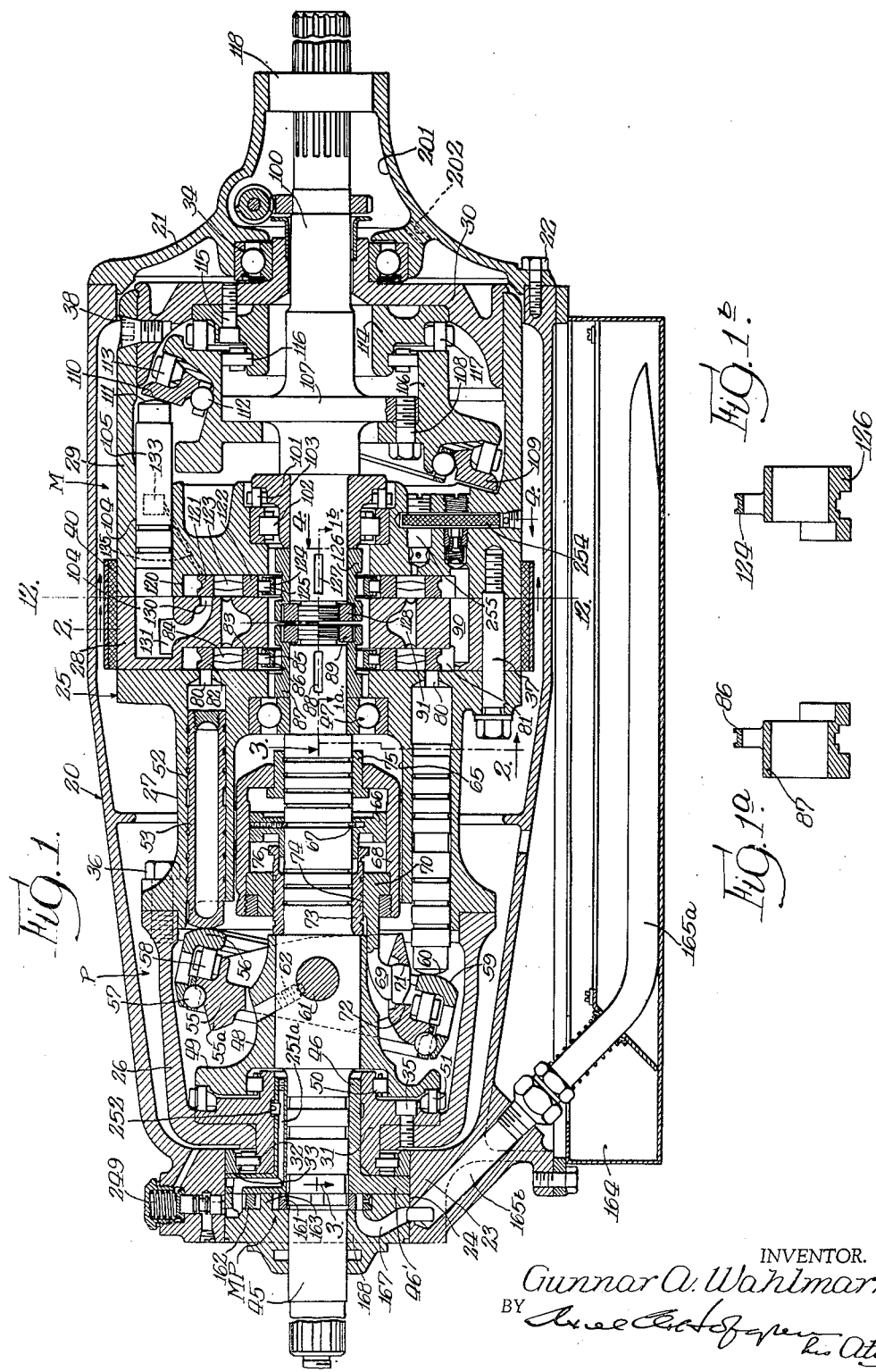
INVENTOR.
Gunnar A. Wahlmark,
BY
his Atty

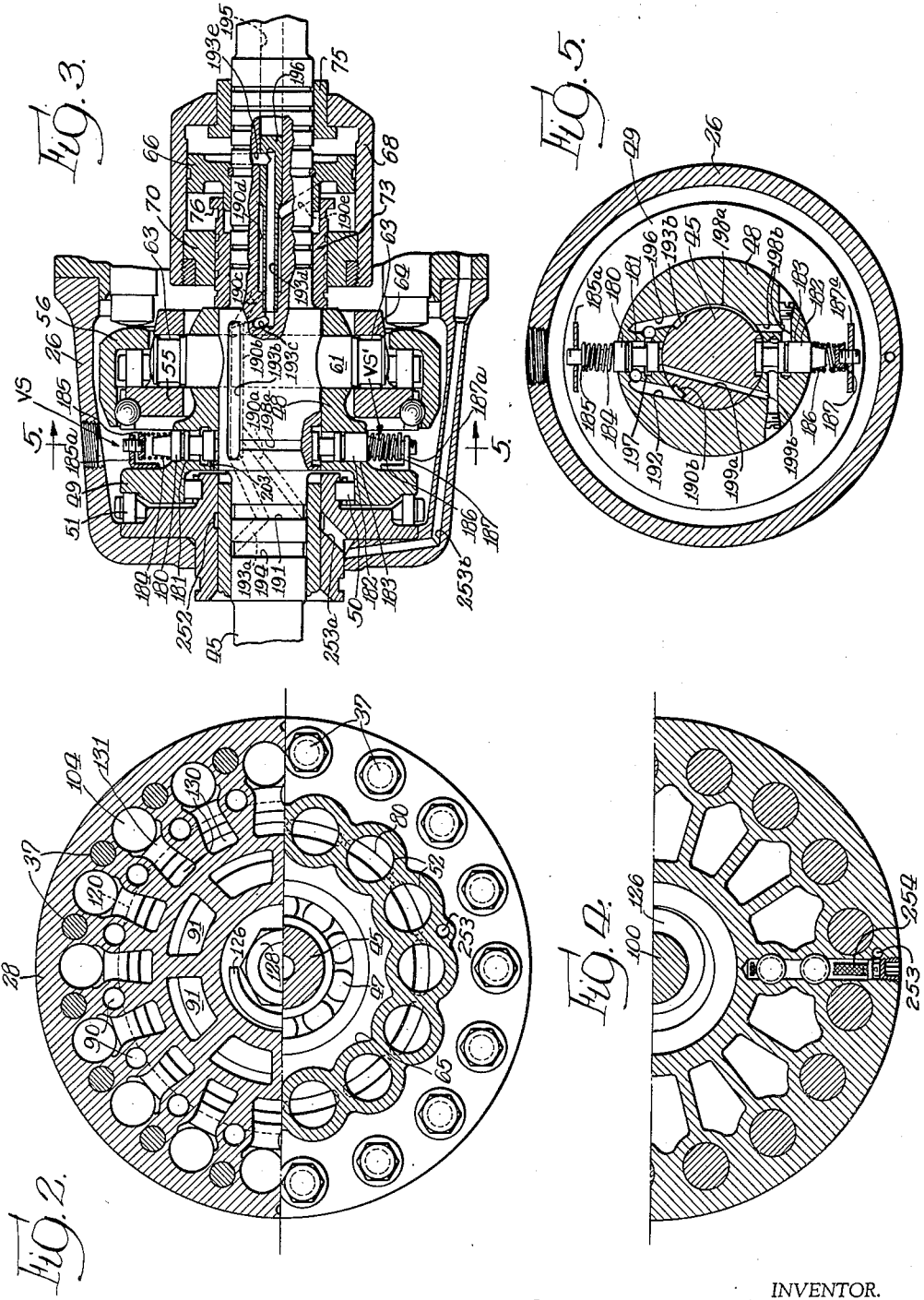

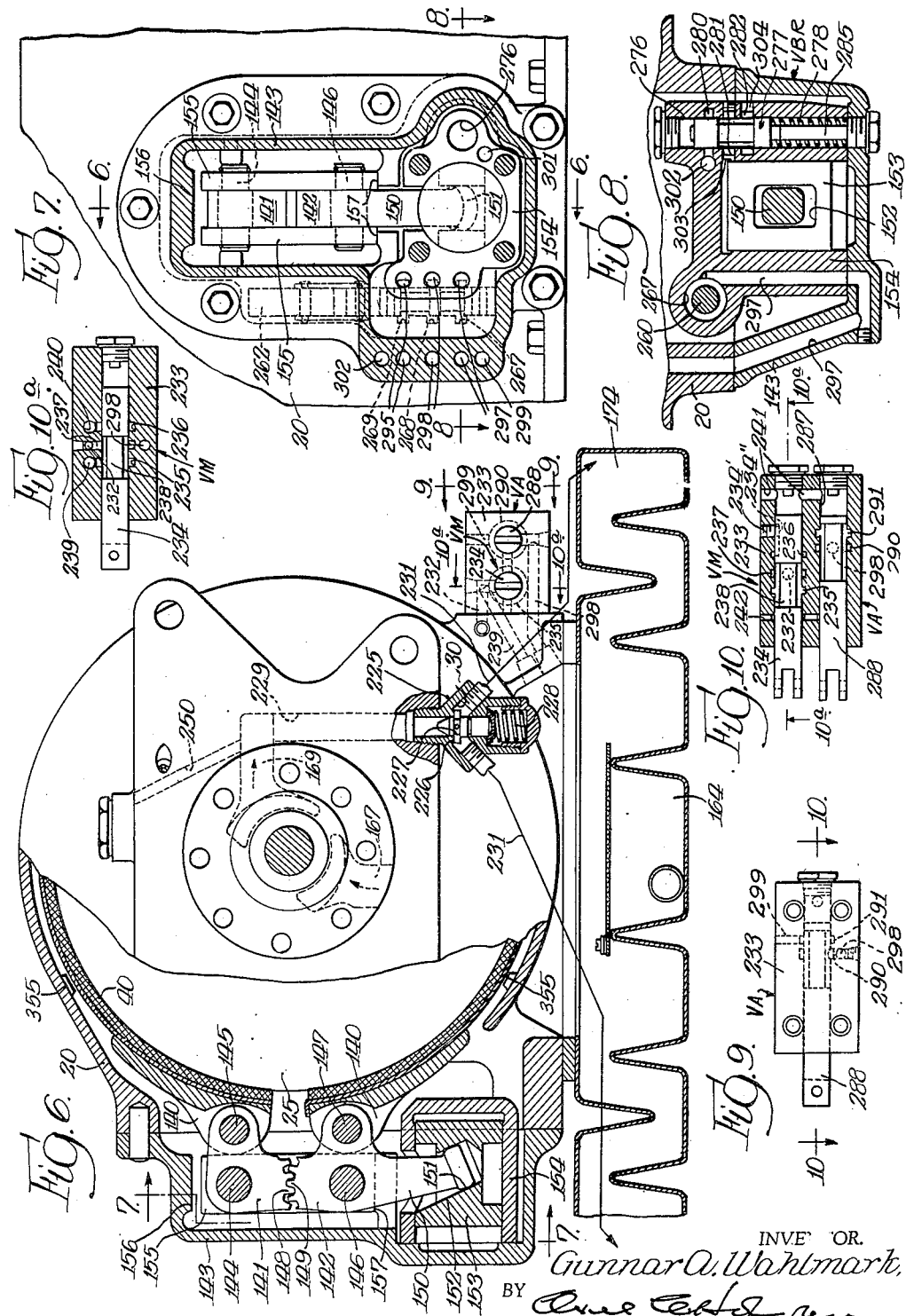

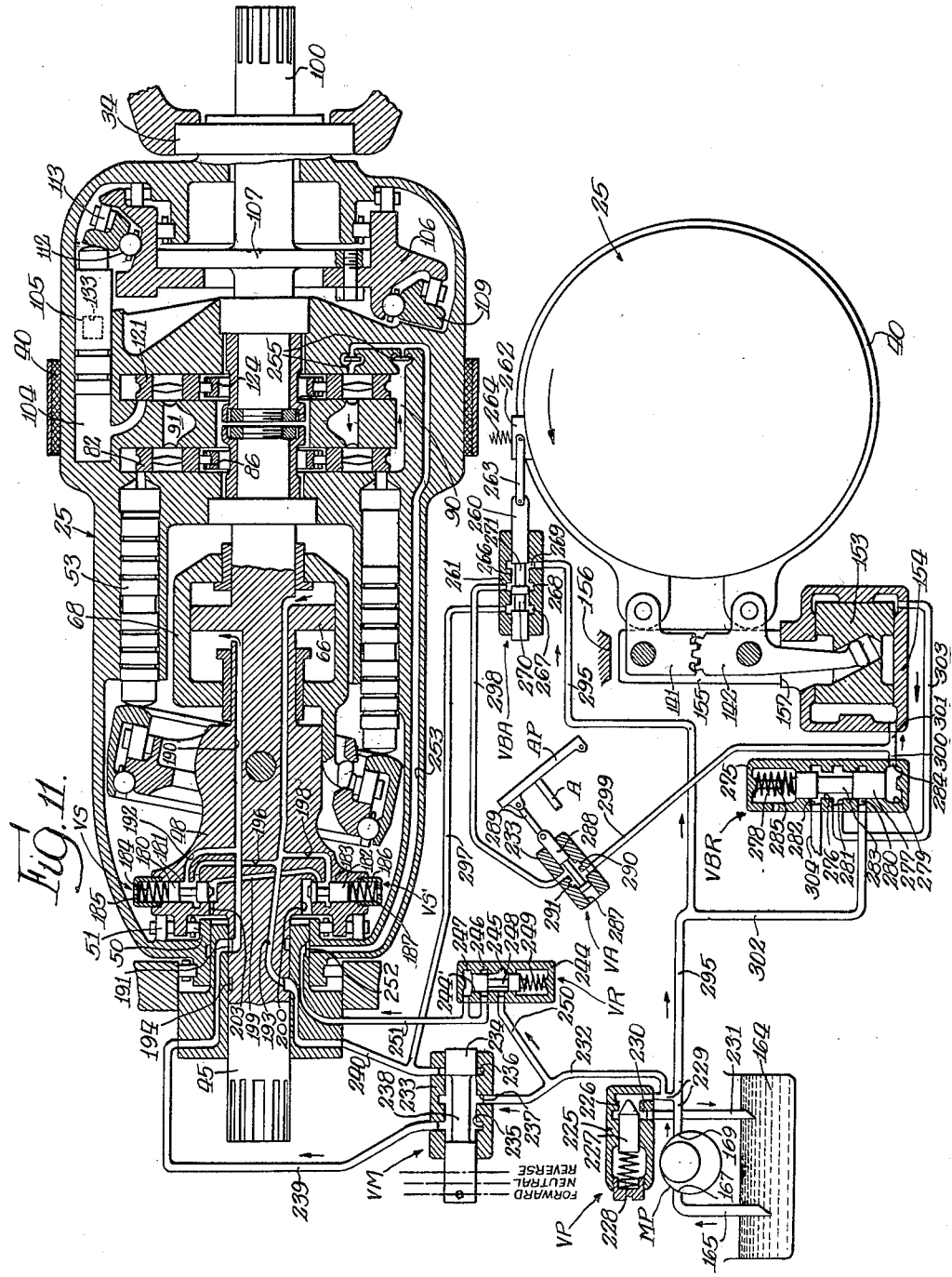

Oct. 10, 1944.  G. A. WAHLMARK  2,360,025
TRANSMISSION
Filed June 5, 1941   10 Sheets-Sheet 5
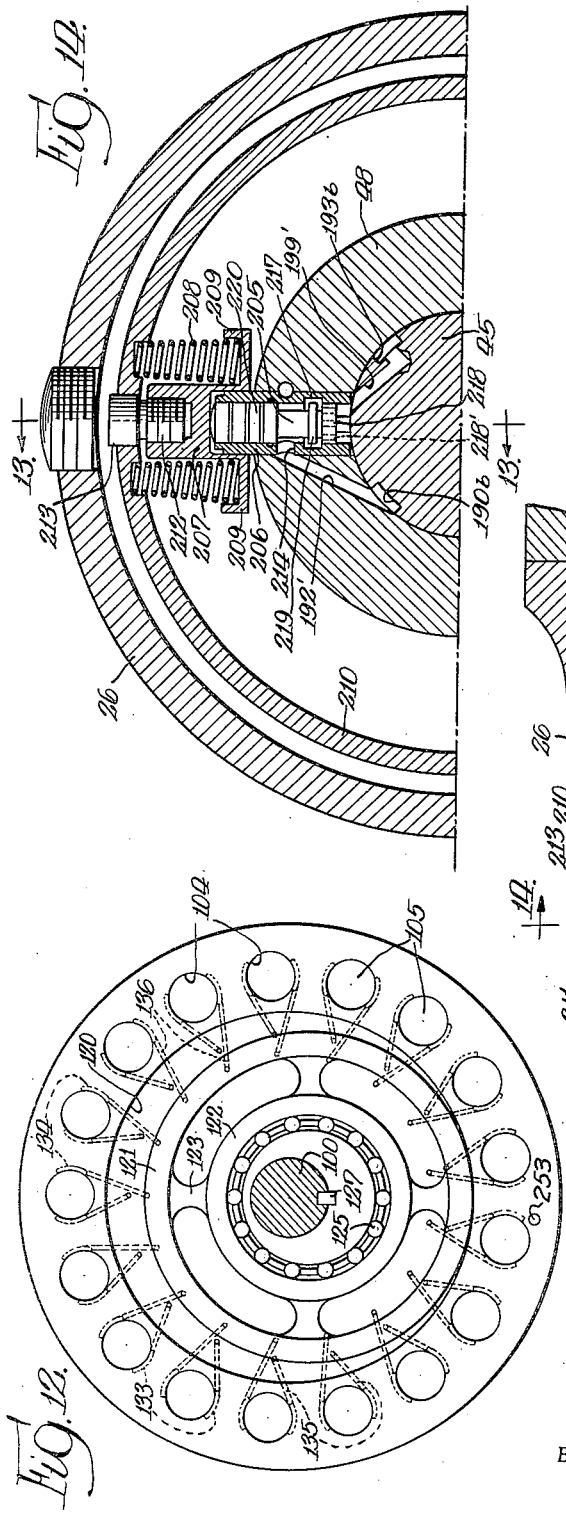
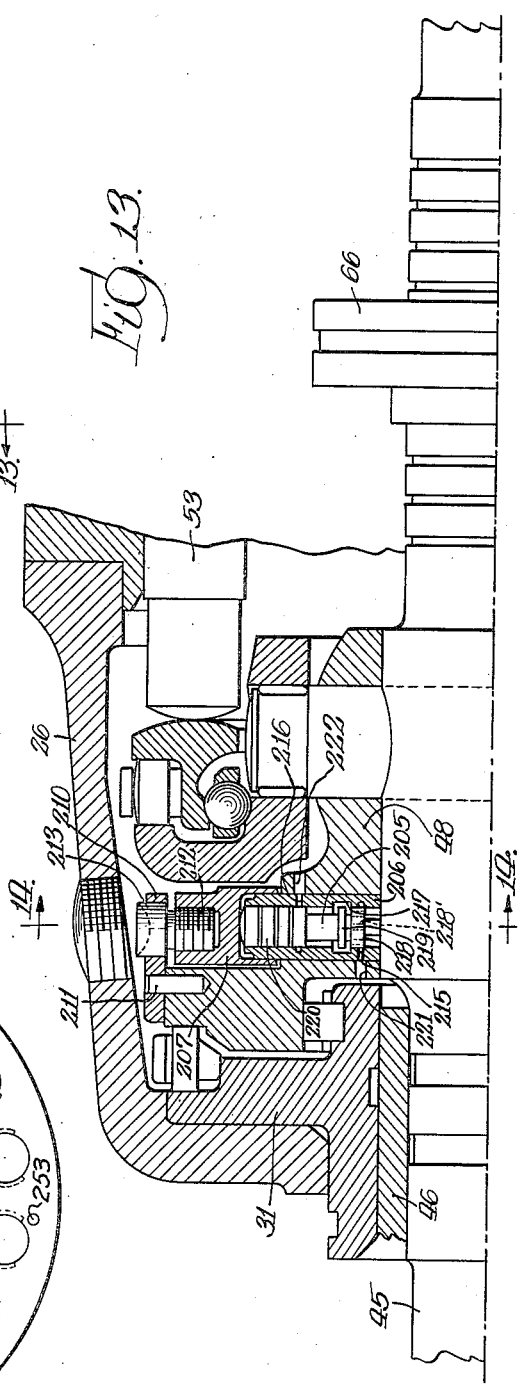
INVENTOR.
Gunnar A. Wahlmark,
BY his Atty.

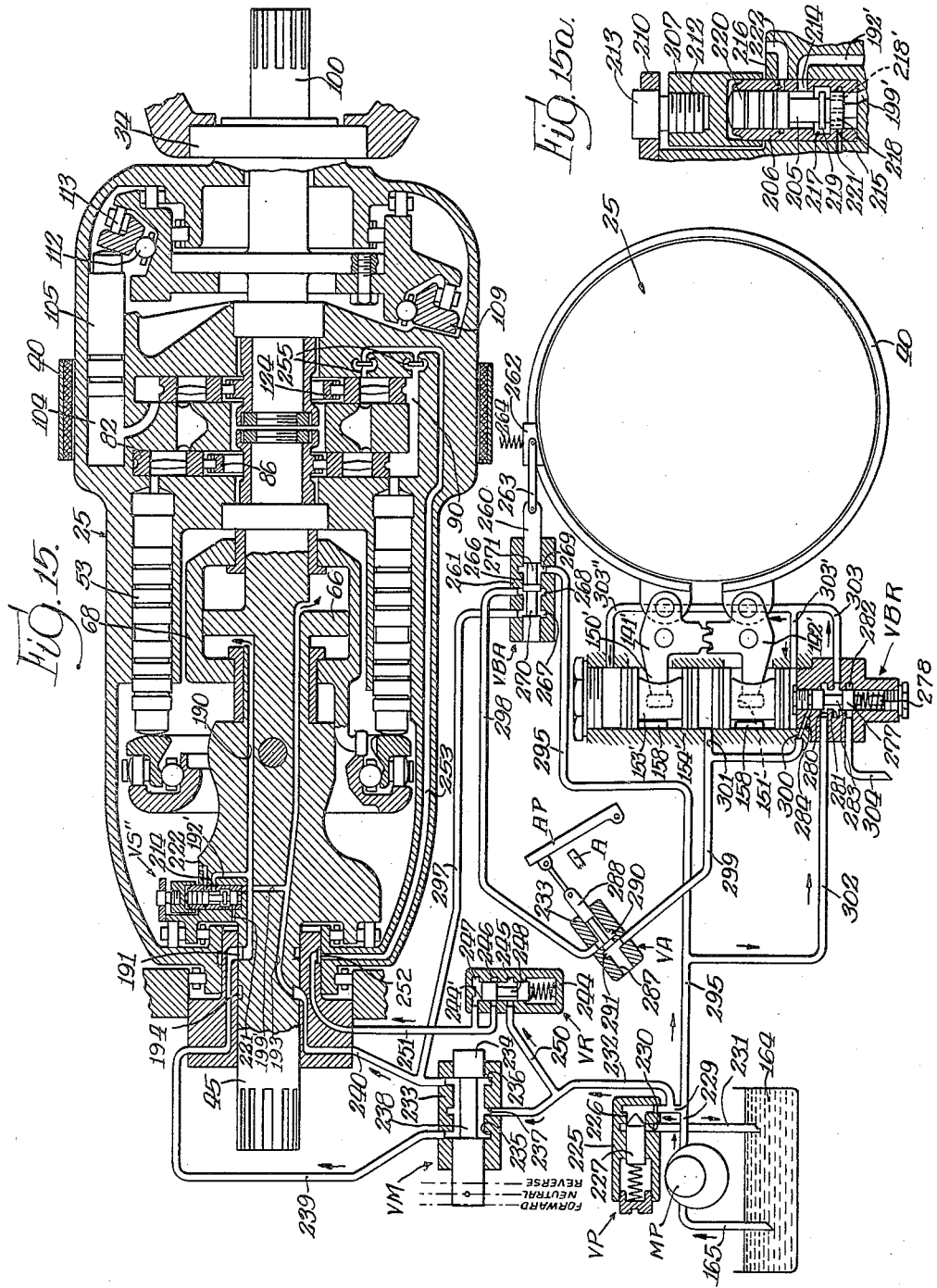

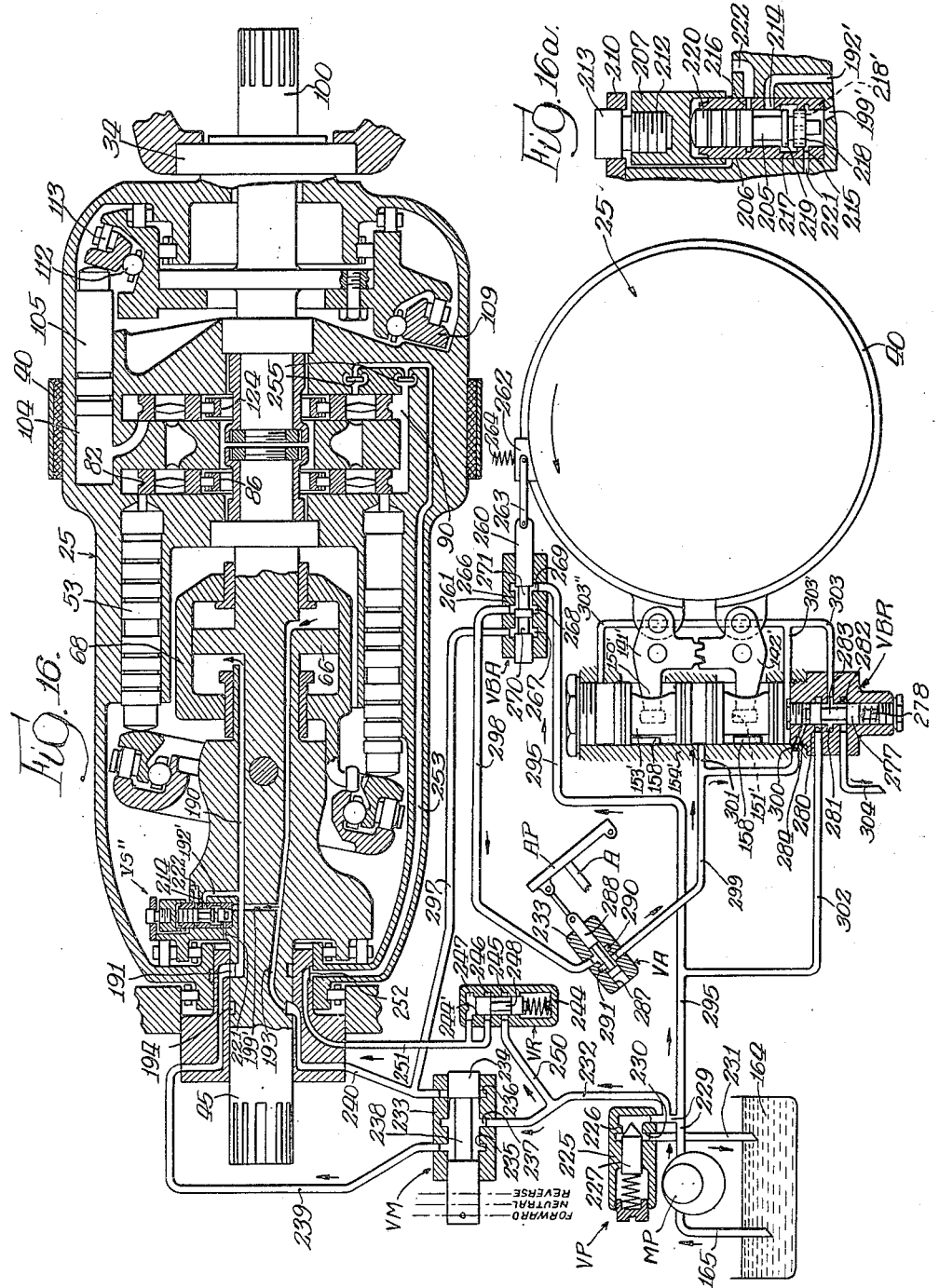

Oct. 10, 1944. G. A. WAHLMARK 2,360,025
TRANSMISSION
Filed June 5, 1941 10 Sheets-Sheet 8
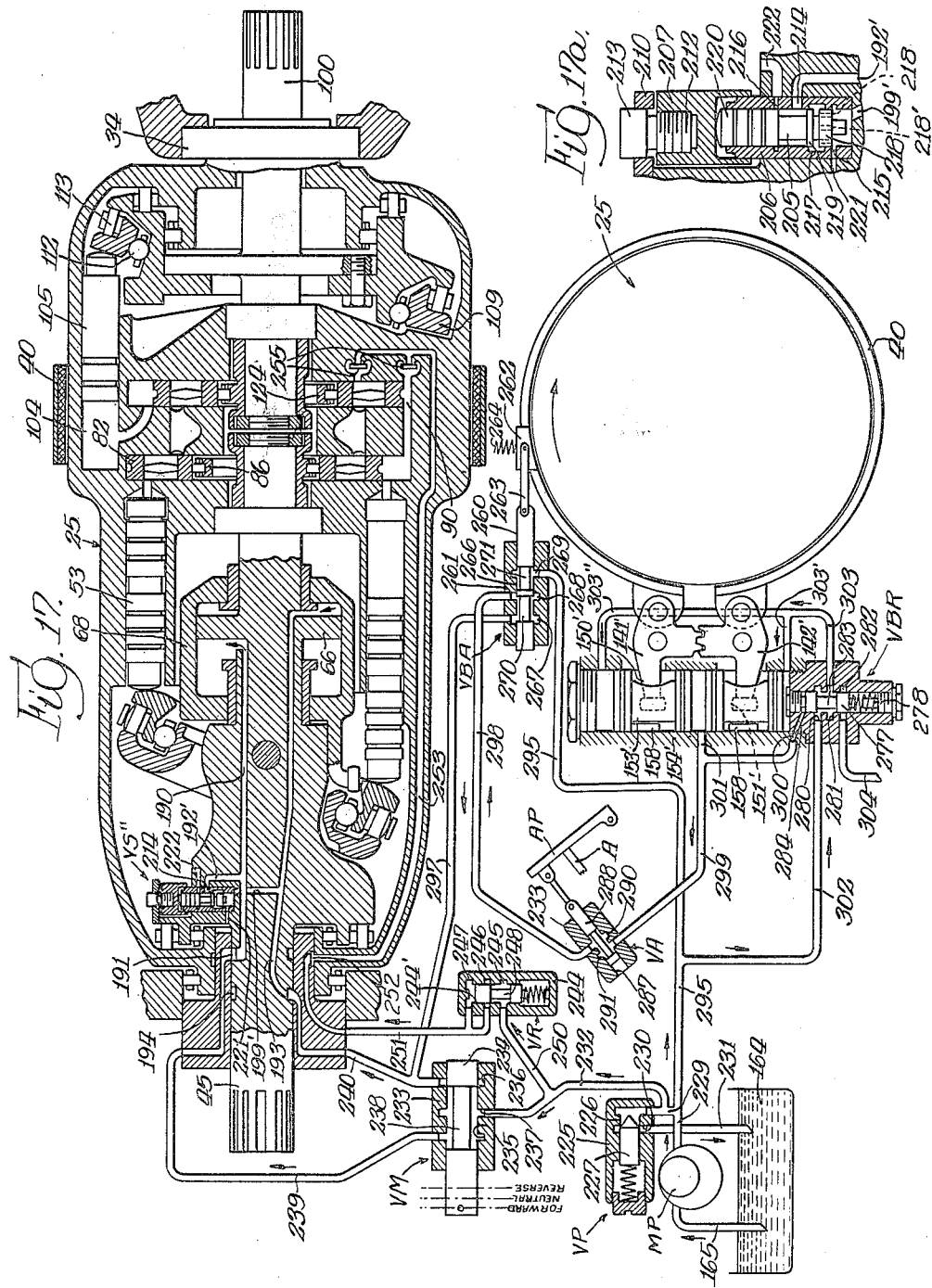
INVENTOR.
Gunnar A. Wahlmark,
BY
his Atty.

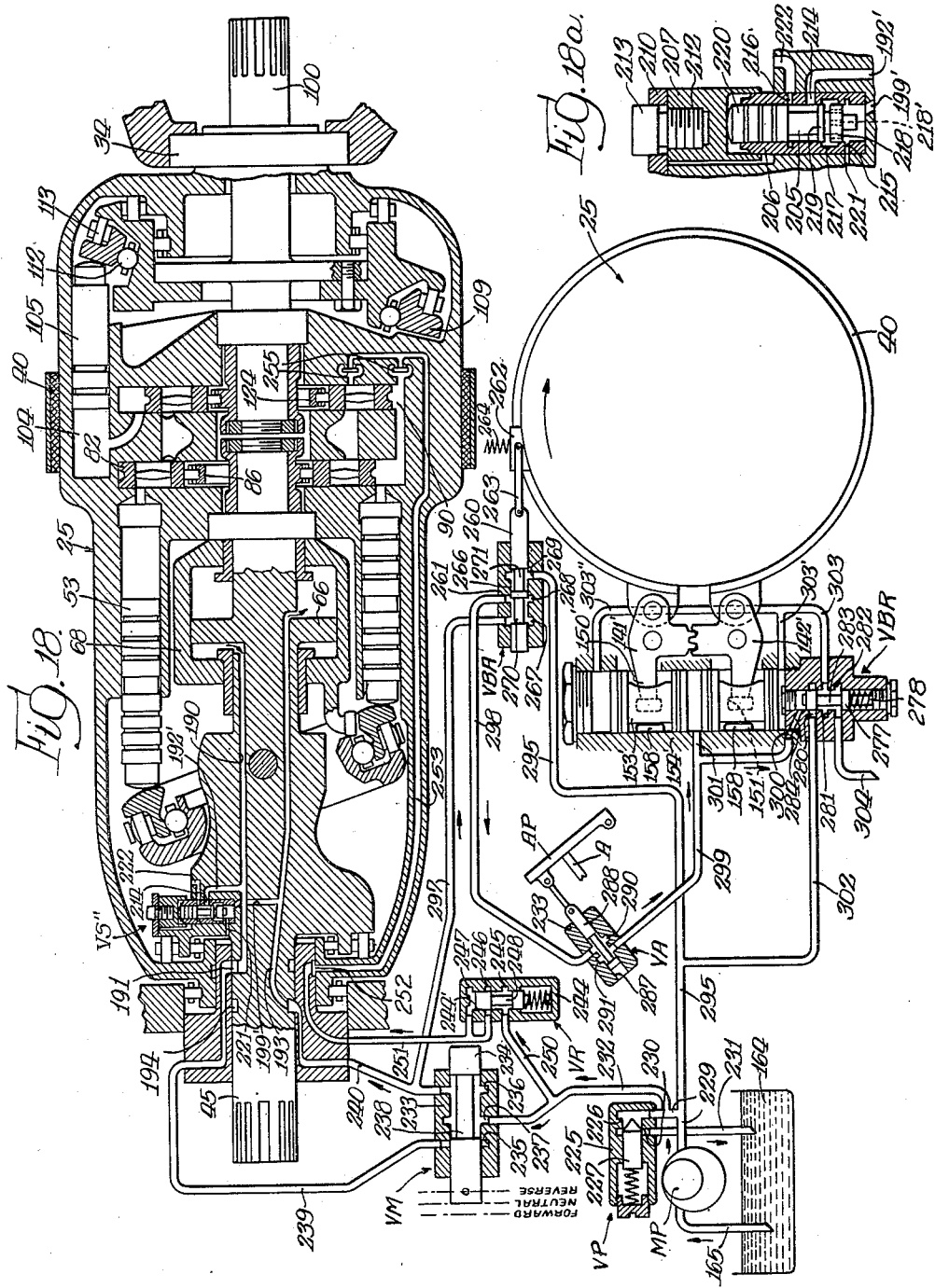

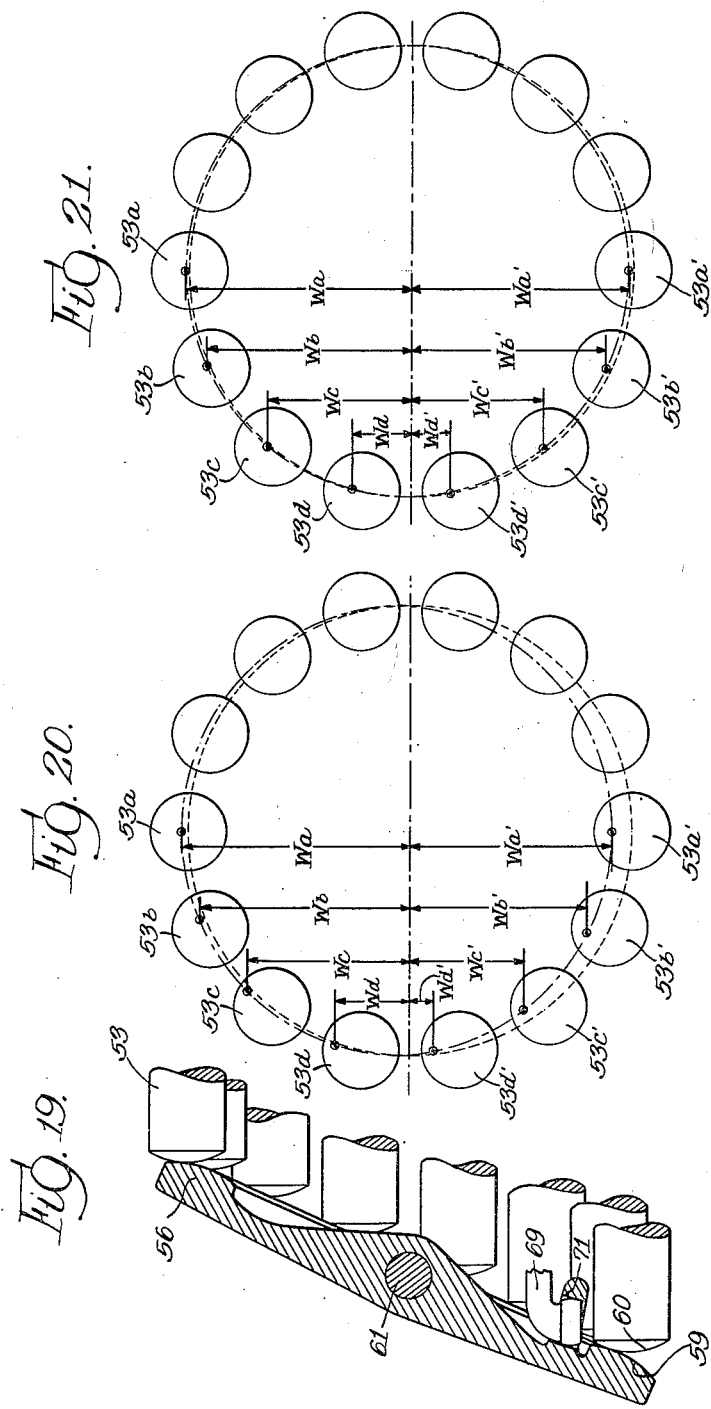

Patented Oct. 10, 1944

2,360,025

UNITED STATES PATENT OFFICE 2,360,025

TRANSMISSION

Gunnar A. Wahlmark, Rockford, Ill.

Application June 5, 1941, Serial No. 396,646

28 Claims. (Cl. 60—53)

This invention relates to transmissions and more particularly to a fluid operated transmission for use in an automotive vehicle. It is the general object of the invention to provide a new and improved transmission of this type.

Another object of the invention is to provide a new and improved fluid transmission which is compact, efficient in operation, and which provides for smooth and stepless automatic acceleration.

Another object is to provide a fluid transmission operable automatically to provide maximum safe acceleration at all times.

Another object is to provide a new and improved fluid transmission operable to multiply the torque available at the driven shaft with substantially no limitation to the ratio and more particularly to provide such a transmission wherein the torque multiplication may be as high as 1000:1.

Another object is to provide a fluid transmission embodying pump and motor devices of the wobbler type and more particularly to provide such a transmission wherein substantially constant pressure is maintained on the wobblers although the working pressure of the pistons varies.

Another object is to provide an automatic fluid transmission embodying a pump together with torque controlled means for governing the displacement of the pump.

Another object is to provide a fluid transmission embodying a pump and motor and means operable automatically to effect a direct drive wherein the pump and motor rotate as a unit with their shafts.

Another object is to provide a fluid transmission having readily adjustable means for varying, under similar conditions of operation, the rate of acceleration of the vehicle with which the transmission is associated.

Another object is to provide a fluid transmission embodying a pump and a motor housed in the same rotatably mounted casing, a brake for holding the casing against rotation under the reaction torque, and means responsive to the reaction torque controlling the brake.

Another object is to provide a fluid transmission embodying a pump, a motor, and control means, and means for supplying make-up and control fluid, the fluid supply means being arranged to assure the supply of make-up fluid prior to the supply of control fluid.

Another object is to provide a fluid transmission manually conditionable while in neutral or at idling in forward, to provide a "hill-holding" effect on the vehicle in which the transmission is incorporated.

Further objects will become readily apparent from the following detailed description taken in connection with the accompanying drawings, in which:

Fig. 1 is a longitudinal central section through a preferred form of the invention.

Fig. 1ª is a fragmentary section along the line 1ª of Fig. 1.

Fig. 1ᵇ is a fragmentary section along the line 1ᵇ of Fig. 1.

Fig. 2 is a section approximately along the line 2—2 of Fig. 1.

Fig. 3 is a section taken approximately at right angles to the section of Fig. 1 (line 3—3 of Fig. 1) and showing part of the structure at the left end of Fig. 1.

Fig. 4 is a section approximately along the line 4—4 of Fig. 1.

Fig. 5 is a section approximately along the line 5—5 of Fig. 3.

Fig. 6 is an elevational view looking at the left hand end of Fig. 1 and partly in section along the line 6—6 of Fig. 7.

Fig. 7 is a fragmentary view partly in section along the line 7—7 of Fig. 6.

Fig. 8 is a fragmentary section along the line 8—8 of Fig. 7.

Fig. 9 is a fragmentary elevational view along the line 9—9 of Fig. 6.

Fig. 10 is a section along the line 10—10 of Fig. 9.

Fig. 10ª is a section along the line 10ª—10ª of Figs. 6 and 10.

Fig. 11 is a fluid circuit diagram.

Fig. 12 is an enlarged sectional view approximately along the line 12—12 of Fig. 1 and rotated 90°.

Fig. 13 is a still further enlarged fragmentary section through a modified form of automatic valve, approximately along the line 13—13 of Fig. 14.

Fig. 14 is a similarly enlarged fragmentary section along the line 14—14 of Fig. 13.

Fig. 15 is a fluid circuit diagram of the modified form of the invention with the manual control valve in its neutral position.

Fig. 15ª is an enlarged fragmentary view of the centrifugal valve means, better to show the valve in the position which it has in Fig. 15.

Fig. 16 is a similar fluid circuit diagram with the manual control valve in its forward position and the transmission functioning to multiply the torque.

Fig. 16ᵃ is an enlarged fragmentary view of the centrifugal valve means, better to show the valve in the position which it has in Fig. 16.

Fig. 17 is a similar fluid circuit diagram with the manual control valve in its forward position and the transmission in direct drive.

Fig. 17ᵃ is an enlarged fragmentary view of the centrifugal valve means better to show the valve in the position which it has in Fig. 17.

Fig. 18 is a similar fluid circuit diagram with the manual control valve in its reverse position.

Fig. 18ᵃ is an enlarged fragmentary view of the centrifugal valve means, better to show the valve in the position which it has in Fig. 18.

Fig. 19 is a fragmentary and enlarged view of one-half of the wobble plate showing the curvature of the contact portion of the wobble plate and the ends of the pistons, and the point of contact for various positions of the pistons.

Fig. 20 is a force diagram showing the point of engagement of the pistons and the effective wobbler arms with the wobbler disposed at a 24° angle.

Fig. 21 is a force diagram similar to Fig. 20, but with the wobbler disposed at a 6° angle.

While there is illustrated in the drawings and hereinafter described in detail a preferred form of the invention, together with a modification thereof, it is to be understood that I do not intend to limit the invention to the particular forms and arrangements shown, it being contemplated that various changes may be made by those skilled in the art without departing from the spirit and scope of the invention as expressed in the appended claims.

In the form illustrated in Figs. 1 to 12, the invention includes a somewhat tubular housing 20 having an end plate or closure 21 secured to the right hand end thereof (Fig. 1) by means of a plurality of bolts 22. The left hand end of the casing is provided with an end wall 23 having a bore 24. Generally, an adjustable wobbler type pump P occupies the left hand portion of the housing and a fixed wobbler type motor M occupies the right hand portion. Rotatably mounted in the housing 20 is a casing, designated generally 25, said casing having a cup-shaped member 26, a pump cylinder block 27, a valve block 28, a motor cylinder block 29, an annular supporting member 30 at its right hand end, and an annular supporting member 31 at its left hand end. The annular supporting member 31 is rotatably mounted on a roller bearing 32, the outer race 33 of which is positioned in the bore 24. The supporting member 30 is rotatably mounted on the end plate 21 by means of a ball bearing 34. Preferably, the parts of the casing 25 are bolted together, the cup-shaped member 26 being bolted to the supporting member 21 by a plurality of set screws 35 arranged in annularly spaced relation, the cup-shaped member 26 being secured to the pump cylinder block 27 by a plurality of bolts 36, the valve block 28 being secured to the pump and motor cylinder blocks by means of a plurality of bolts 37 and the motor cylinder block 29 being secured to the supporting member 30 by means of a plurality of set screws 38. Although mounted rotatably upon and within the housing 20, the casing 25 is arranged to be held against rotation as hereinafter more fully described by means including a brake band 40 operable against the exterior cylindrical surfaces of the valve block 28 and motor cylinder block 29.

The pump P has a shaft 45 which is rotatably mounted on the supporting member 31 by means of a sleeve bearing 46 and on the pump cylinder block 27 by means of a ball bearing 47. The shaft 45 carries a sleeve-like member 48 which is provided with a flange 49 between which and the supporting member 31 are mounted roller bearings 50 and 51.

The pump has a plurality of annularly spaced cylinder bores 52 in the cylinder block 27 in which hollow pistons 53 are reciprocably mounted. As illustrated herein (Figs. 1 and 2), the pump has fourteen such cylinders and pistons. The pistons are arranged to be actuated by a wobbler comprising an annular inner member 55 and an annular outer member 56, said outer member being rotatably mounted on the inner member by means of a ball bearing 57 and a roller thrust bearing 58. The outer member 56 has a curved surface 59 engageable against the adjacent curved end surfaces 60 of the pistons 53. The inner member 55 (Figs. 1 and 3) is pivotally mounted on the shaft 45 by means of a diametrically extending pin 61 which is anchored to the shaft by means of a set screw 62 and at its opposite ends carries needle bearings 63 (Fig. 3) which are positioned within diametrically opposite bores 64 of the member 55.

The wobbler is arranged to be adjusted angularly with respect to the pin 61 by means of a piston and cylinder device housed within a recess 65 in the cylinder block 27. As illustrated herein, this device consists of a piston 66 secured to the shaft 45 and against longitudinal movement thereon by means of a lock ring 67. The ring 67 for holding the piston in place on the shaft is first located in the piston in an expanded condition so that it can slide over the shaft. Three set screws are then used for contracting the snap ring into the groove in the shaft in which position it holds the piston against longitudinal movement on the shaft. A shiftable cylinder 68 cooperates with the piston 66 and is connected to the wobbler by means of an arm 69 which projects from one end wall 70 of the cylinder and has a spherically formed outer end 71 engaged in a radially extending bore 72 in the member 55. The cylinder 68 is slidable longitudinally of the shaft and piston. As illustrated in Fig. 1, the shiftable cylinder 68 is slidable on bushings 73 and 75 which bushings in turn are slidable on the shaft. Sleeve bushing 73 slidably engages a bore 74 in the end wall 70 and sleeve bushing 75 slidably engages in a bore in the opposite end wall of the cylinder. The bushings cooperate with the cylinder to determine the neutral position of the wobbler. For example, if fluid under pressure is admitted to both ends of the cylinder 68, the cylinder and the bushing 75 will move toward the right from the position in Fig. 1 until the bushing 75 engages the stop formed by the inner race of the ball bearing 47. The wobbler will then be in its neutral position and the cylinder wall 70 will engage a flange 76 on the bushing 73. Since the fluid pressure in both ends of the cylinder 68 is then equal, it will act against surfaces of equal size on the cylinder and bushings and hold the wobbler in its neutral position. The end of the sleeve-like member 48 acts to limit the movement of the shiftable cylinder toward the left (high speed forward), the movement of the shiftable cylinder toward the right (reverse) being limited by engagement of a counter-balancing and stop portion 55a on the wobbler 55 with the sleeve 48.

The invention contemplates the provision of control means for automatically shifting the wobbler to adjust the stroke of the pistons. Such a means will be described more fully hereinafter.

The cylinders 52 of the pump are provided with cylinder ports 80 (Figs. 1 and 2) which extend through to the end surface of the cylinder block 27 where they communicate with a cylindrical valve chamber 81 in the valve block 28. The flow of fluid through the cylinder ports 80 is arranged to be controlled by means of a wheel-like valve of the type disclosed and claimed in Letters Patent No. 2,190,812 which issued to me on February 20, 1940. Generally, this valve has a rim 82 and an annular hub 83 connected by a plurality of spokes 84. The hub on the valve is mounted by means of a roller bearing 85 on an eccentric 86 (Figs. 1 and 1a), which eccentric is formed integrally with a sleeve 87 secured to the right hand end of the shaft 45 by means of a key 88 and in between the adjacent inner race of the ball bearing 47 and a clamping nut 89 secured to the end of the shaft 45. The rim 82 of the valve operates to connect the cylinder ports 80 alternately with the outer portion of valve chamber 81 (which connects with a plurality of pump ports 90 in the valve block 28) and the inner portion of the valve chamber which connects with a plurality of pump ports 91 formed in the valve block 28. The pump ports 90 and 91 communicate with the valve chamber of the motor M as hereinafter more fully described.

As illustrated herein the motor M has a shaft 100. Adjacent its inner end this shaft carries a bushing 101 which cooperates with a radial roller bearing 102 and a thrust roller bearing 103 to support the shaft 100 rotatably on the motor cylinder block 29. The motor has a plurality of cylinder bores 104 spaced annularly about the shaft 100, in which pistons 105 are reciprocably mounted. The cylinders extend through the cylinder block 29 and into the valve block 28. As illustrated herein, the motor has seventeen such cylinders and pistons. These pistons are effective to rotate the shaft 100 through motion converting means consisting of a fixed angle wobble plate having an inner annular member 106 secured to a flange 107 on the shaft 100 by means of a plurality of bolts 108, and an outer annular member 109 which is provided with a flat surface 110 arranged to engage the adjacent conically surfaced ends 111 of the pistons 105. The outer member 109 is rotatably mounted on the inner member 106 by means of a ball bearing 112 and a roller thrust bearing 113. The inner member 106 is rotatably supported with respect to the casing supporting member 30 by means of a bushing 114 (secured to the member 30 by a plurality of bolts 115), a roller bearing 116 and a roller thrust bearing 117. Preferably, an oil seal 118 is positioned between the shaft 100 and the end plate 21 of the housing 20.

The motor M has a wheel-like valve similar to the pump valve. The motor valve is positioned in a cylindrical valve chamber 120 and consists of an annular rim 121, an annular hub 122 and a plurality of intermediate spokes 123. The annular hub 122 is rotatably mounted on an eccentric 124 (Figs. 1 and 1b) by means of a roller bearing 125, the eccentric 124 being provided with an integral bushing 126 which is secured to the shaft 100 by means of a key 127 and is located between the bushing 101 and a clamp nut 128 on the inner end of the shaft 100. As illustrated herein, the cylinder ports for the motor cylinders are indicated at 130 (Fig. 1) and communicate with the inner ends of the cylinders 104 by means of connecting passages 131. The cylinder ports 130 are arranged to be connected alternately with the outer portion of the valve chamber 120 (to which the pump ports 90 are connected) and the inner portion of the valve chamber (to which the pump ports 91 are connected). Thus, in the operation of the transmission, when the pump ports 90 are the outlet ports of the pump, the motor shaft will be rotated in a forward direction (i. e. the same direction as the pump shaft 45 is rotating) and the fluid exhausted from the motor will be returned directly to the pump ports 91 which are then pump inlet ports. If the wobbler for the pump is shifted in a counterclockwise direction from that shown in Fig. 1 beyond a radial plane so as to reverse the flow of fluid through the pump, the pump ports 91 become the pump outlet ports with the result that the flow of fluid through the motor is reversed and the direction of rotation of the motor shaft 100 is reversed. The pump ports 90 then become pump inlet ports and carry back to the pump the fluid exhausted by the motor. The circuit from the pump to the motor is closed so that the fluid (preferably oil) flows directly from one device to the other, provision being made as hereinafter more fully set forth to supply make-up fluid to the circuit to replace any which leaks out.

Due to the angle of the motor wobble plate as the pistons 105 act thereon, a side thrust on each piston is set up tending to cause twisting and, hence, binding of the piston. To counteract this side thrust, each cylinder 104 is provided with diametrically opposite recesses 133 and 134. As best seen in Fig. 12, these recesses are disposed on a diameter that is tangential to a circle through the centers of the cylinders. Each recess 133 is connected by a duct 135 with the valve chamber 120, and each recess 134 is also connected by a duct 136 to the valve chamber 120 radially inwardly of the duct 135. These ducts 135 and 136 are governed by the motor wheel valve to supply pressure fluid to the recesses 133 when the motor is driven forward and to supply pressure fluid to the recess 134 when the motor is driven in reverse direction. In addition to counteracting this side thrust, this construction also serves to reduce the heat generated in the motor block.

During the operation of the transmission, there are times when the casing 25 rotates with the pump shaft 45 and motor shaft 100, at which time the flow of fluid in the pump-motor circuit is substantially stopped or locked and the transmission is in substantially a 1:1 ratio. When functioning to operate the motor shaft 100 at a reduced speed, however, the casing 25 is held against rotation by means of the brake band 40. This brake band, as illustrated in Figs. 1, 6 and 7, has lugs 140 (Fig. 6) secured to its opposite ends. These lugs are pivotally connected to bell crank levers 141 and 142 which are pivotally mounted in a box 143 bolted on the rear side of the housing 20. Lever 141 is pivotally mounted on a pin 144 and is pivoted to one lug 140 by means of a pin 145. Lever 142 is pivotally mounted on a pin 146 and is connected to the other lug 140 by means of a pin 147. As illustrated in Fig. 6, one arm of the lever 141 is provided with gear teeth 148 which mesh with corresponding gear teeth 149 on the lever 142. The levers are arranged to be actuated by means of an arm

150 on the lever 142, the outer end of said arm having a spherically surfaced portion 151 engaging in an inclined bore 152 in a piston 153. This piston is reciprocably mounted in a cylinder 154 secured to the box 143 and is operable by means of fluid under pressure in a manner hereinafter more fully described. When the piston 153 is in the position shown in Fig. 6, the brake band 40 is engaged with the casing 25. When the piston 153 is moved toward the left, the brake band is released from the casing 25 and expanded and held centered against lugs 355 on the housing 20.

The pivot pins 144 and 146 for the bell crank levers 141 and 142 are not anchored directly in the box 143, but are carried on a pair of laterally spaced and vertically extending bars 155 which are positioned within the box 143 so as to have a limited vertical movement between an upper stop surface 156 and a lower stop surface 157. This movable support for the bell crank levers is provided so that the casing 25 may have a slight rotary movement with respect to the housing 20 even when the brake band 40 is applied. The purpose for this arrangement will appear more fully hereinafter.

In Figs. 15 to 18, there is illustrated a slightly modified form of brake actuating structure employing a pair of pistons 153' instead of a single piston. The pistons 153' are reciprocable in a common cylinder 154' having a port opening to each end and a port opening to the middle. With a pair of pistons 153', the bell crank lever 141' as well as the lever 142' has an arm 150' terminating in a spherical surface 151'. The arms 150' extend at right angles to the arms bearing the teeth, and each engages one of the pistons 153'. Movement of each piston 153' is limited by a fixed stop 158. In other respects the construction is the same as that of Figs. 1 to 11.

In the forms illustrated herein, the invention is adapted particularly for use in automotive vehicles and the controls are selected for such applications. Herein the controls are such as to make the operation of the transmission automatic, save where manual selection is desirable, and are hydraulic in character. Generally the controls include (see Figs. 11 and 15 to 18) a manually operable direction selector valve VM, an accelerator operated valve VA, a brake applying valve VBA, a brake release valve VBR, a valve VP for controlling the pressure of the fluid supplied by a makeup pump MP for control purposes, a pressure reducing valve VR in the make-up fluid supply line, and speed responsive valves VS and VS' responsive to the speed of the drive shaft 45 and exercising control over the speed of the driven shaft 100 with respect to the speed of the drive shaft 45. Herein the direction selector valve VM has three operative positions, that is, "forward," "neutral" and "reverse." The accelerator operated valve VA has two operative positions. One of these is shown in the position of the accelerator pedal AP in Fig. 15, in which the pedal is spaced from the accelerator proper represented at A. This position of the accelerator valve and of the accelerator pedal will hereinafter be referred to as the pre-idle position, inasmuch as it is a position to which the accelerator pedal withdraws after the accelerator proper has returned to its normal engine idle position. The second position of the accelerator valve VA in reality covers a range of positions defined by the range of operation of the accelerator A. One such position is shown in Fig. 11 and the range extends from a point just prior to engagement of the accelerator pedal with the accelerator A to a maximum actuation of the accelerator A. The brake applying valve VBA has two operative positions, one shown in Fig. 11, which is occupied when the reaction torque on the casing 25 is in a counterclockwise direction and the brake parts 155 have moved downwardly against the stop 157, and another shown in Fig. 17 in which the torque on the casing 25 has reversed, that is, in a clockwise direction and the brake parts 155 have moved upwardly against the stop 156. The brake release valve VBR likewise has two positions, namely, the brake applied position shown in Fig. 11, and the brake released position shown in Fig. 17. The above mentioned valves, as well as the pressure control valve VP, the pressure reducing valve VR, and the speed responsive valves VS and VS' will all be described more fully hereinafter.

As mentioned hereinbefore, a make-up pump MP is provided for supplying leakage fluid to the pump-motor circuit and also for providing fluid under pressure to the control circuits of the transmission. Such a make-up pump may be of the type disclosed in my prior Patent No. 2,132,813, dated October 11, 1938. This pump consists of a toothed rotor 161 keyed to the shaft 45 and a corresponding internally toothed ring 162 meshing therewith. The ring 162 is eccentric with respect to the shaft 45 so that a crescent guard 163 may project between the separated portions of the rotor and ring.

The rotor and ring of the pump are mounted in a recess formed in the inner face of a plate 168 positioned in the outer end of the bore 24 of the housing 20, the recess being closed to complete the pump chamber by a flange 46' formed on the outer end of the sleeve bearing 46. As best seen in Fig. 6, the pump has an intake port 167 and a discharge or outlet port 169. The pump is effective to draw fluid from a tank 164 through an intake conduit diagrammatically shown in Fig. 11 at 165. Actually this conduit is composed of a tube or pipe 165a and a passage 165b formed in the housing 20 (see Fig. 1). Fluid discharged is maintained at a constant pressure by the pressure valve VP and is supplied to the valves for controlling the brake 40; to the leakage make-up valves; and through the manual valve VM and under the control of the speed responsive valves VS and VS' to the means for determining the position of the pump wobble plate.

In the form illustrated in Figs. 1 to 12, the automatic control for adjusting the output of the pump P includes, as previously stated, the speed responsive valves VS and VS'. The valve VS has a valve core 180 of the cylinder type slidably mounted in a radial bore 181 in the member 48, and the valve VS' similarly has a valve core 182 of the cylinder type slidably mounted in a radial bore 183 positioned diametrically opposite to the bore 181 in the member 48. The valve core 180 is urged toward its innermost position by means of a coiled spring 184 positioned between the outer end of the valve core and a cap 185 screw threaded into a bracket 185a on the member 48. The valve 182 is urged toward its innermost position by means of a coiled spring 186 positioned between the outer end of the valve and a cap 187 screw threaded into a bracket 187a on the member 48. In general, the valve VS acts as a pressure reducing valve for the fluid which flows from the make-up pump MP to the opposite ends of the shiftable cylinder 68, while the valve VS' operates to control fluid for pre-loading the valve VS.

As illustrated most clearly in the circuit diagram of Fig. 11, fluid from the make-up pump MP is supplied to the cylinder 68 through means including a conduit 190 which communicates at its right hand or terminal end with the left hand end of cylinder 68, and at its left hand end communicates with an external annular groove 191 (Fig. 3) formed in the shaft 45. Physically the conduit 190, as best seen in Figs. 3 and 5, is made up of an oblique bore 190a, a longitudinally extending groove 190b opening through the surface of the shaft 45, and oblique bore 190c, an annular passage 190d, and a generally radial bore 190e opening to the left end of the cylinder 68 through the piston 66. A branch duct 192 leads from the conduit 190 (in the actual embodiment from the groove 190b) to the valve bore 181. Fluid is supplied to the right hand end of the cylinder 68 through means including a conduit 193 having its right hand or terminal end opening to the right end of the cylinder 68 and having its left hand end communicating with an annular groove 194 formed in the outer surface of the shaft 45. In its actual physical embodiment, the conduit 193 is composed of a bore 193a, a longitudinally extending groove 193b opening outwardly of the shaft 45, a generally radial bore 193c, an axial bore 193d, and a radial bore 193e opening to the right hand end of the cylinder 68. The bore 193d is formed by the insertion in an axial bore 195 in the shaft 45 of a tube 196 closed at one end, the tube having a reduced portion to form with the bore 195 the annular passage 190d of conduit 190. A first branch duct 196 leads from the conduit 193 (in the physical embodiment (see Fig. 5) from the groove 193b) to an annular groove 197 formed in the valve bore 181 spaced radially inwardly with respect to the point of communication with the bore of the branch duct 192. A second branch 198 leads from the conduit 193 and communicates with the valve bore 183, this branch being composed of a groove 198a in the periphery of the shaft 45 and right angular bores 198b in the member 48. The valve bores 181 and 183 are interconnected by a passage 199 composed (see Fig. 5) of a bore 199a in the shaft and of bores 199b in the member 48, the passage communicating with the inner end of the bore 181 and with the bore 183 inwardly of the point of communication therewith of the branch 198. The inner end of the bore 183 is through a passage 200 connected to the tank 164, through a devious route. The passage 200 discharges to the casing 25 and the fluid so returned passes over the operating mechanisms such as the pump wobbler between the shiftable cylinder 68 and the bore 65 through the bearings 47, eccentrics 68 and 124, bearings 102 and 103 over the motor wobbler and between the shaft 100 and the supporting member 30 into an end chamber 201 in the plate 21, thence through a passage 202 in a rib of the member 21 and the housing 20, and an aperture in the housing. Similarly, discharging to the tank from the bore 181 is a restricted passage 203. Each the valve core 180 and the valve core 182 has a pair of lands suitably spaced so that in the innermost position of the valve core 180 both the branch duct 192 and the branch duct 196 have complete communication with the bore 181, while in the innermost position of the valve core 182 branch 198 is closed and passage 199 is in communication with the passage 200.

With the shaft 45 rotating at idling speed, for example, 350 R. P. M., both the valve core 180 and the core 182 are in their innermost positions. The valve VS' is, however, adjusted to move to its outer position with any increase in speed of rotation of the shaft 45 above its normal idling speed, reaching its fully shifted position at about 500 R. P. M. With such increase in speed, the valve core 180 also has a tendency to shift outwardly and is made sensitive to shaft speed variations by pre-loading through application of fluid under pressure to the inner end of the core 180, such fluid being under the control of the valve VS'. With a shift of valve core 182 outwardly, the pressure in the conduit 193 is communicated to the valve bore 183 by means of the branch 198 and is further communicated from the valve bore 183 to the inner end of the valve bore 181 by the passage 199. The valve VS will thus assume a position such, for example, as that shown in Fig. 11, wherein it may be assumed that the shaft is rotating above idling speed, for example 400 R. P. M. In this position, the inner land of the valve core partially closes communication with the passage 196 and thereby causes a reduction in the pressure of the fluid applied to the right hand end of the cylinder 68 through conduit 193, whereas the left hand end of cylinder 68 is subject to the full pressure of the fluid supplied by the make-up pump MP to the conduit 190.

This unbalance of pressures will cause a shift of the cylinder 68 to the left with a tilt of the wobbler from its neutral position, it being understood, of course, that such tilt is resisted by the reaction of the pistons 53 tending to restore the wobbler to neutral position. As the speed of shaft 45 increases and the valve 180 continues to move outwardly, pressure is further reduced to the right hand end of the cylinder 68 with the result that the cylinder tends to shift further toward the left with respect to the piston 66 to pivot the wobbler to increase the stroke of the pump pistons 53. This outward shifting of the valve core 180 with a resultant increasing unbalance in the cylinder 68 continues until the shaft speed reaches 1200 R. P. M., the valve core 180 completely preventing communication between branches 192 and 196 at about 1200 R. P. M. The pivoting of the wobbler continues until such time as the output of pump P is at its maximum. Since the capacity of the motor M is equal to the capacity of the pump P, the shaft 100 of the motor will rotate at the same speed as the pump shaft when the pump displacement reaches its maximum. Under these conditions, the reaction torque of the motor on the casing 25 will be balanced by the forward torque of the pump on the casing, so that if the brake 40 is released the casing 25 will rotate with the shafts 45 and 100 as a unit.

In further explanation of the above, with the pump wobbler adjusted as illustrated in Figs. 1 and 11, wherein it is shown at approximately one-half maximum pump stroke, the motor shaft 100 will operate at approximately one-half the speed of the pump shaft 45. Under these conditions the torque output of the motor shaft 100 is twice the torque applied to the pump shaft 45 and similarly the reactive torque on the motor cylinder block is twice the torque applied to the pump shaft 45. Since the torque applied to the pump cylinder block is equal to the torque applied to the pump shaft 45, there is a reactive torque on the casing 25 as a whole tending to rotate it in a reverse direction, which rotation, however, is prevented by means of the brake band 40. As the speed of the shaft 45 is increased and the displacement of the pump is increased, the torque of the motor shaft 100 decreases relatively to the torque applied to the pump shaft 45 until the motor torque is equal to the applied torque. This condition arises somewhat prior to the time the pump wobbler is in its maximum output position due to the losses in the pump and motor. When this balance is reached between the motor output torque and the pump input torque, a balance is also reached between the motor reactive torque on the casing 25 and the pump forward torque on the casing 25 with the result that further increase in the speed of the pump shaft 45 causes the pump torque to overcome the motor reactive torque and the casing 25 tends to rotate in a forward direction (the same as the shafts 45 and 100). In a practical embodiment of the invention, it has been found that with a horsepower load on the motor shaft 100 equal to the horsepower input on the pump shaft 45 and with the pump shaft 45 rotating at a speed of 1200 R. P. M., the pump and motor torque on the casing 25 were balanced when the motor shaft speed reached 1100 R. P. M. When the casing tends to rotate in a forward direction, control means is operable to release the brake band 40 to permit such rotation.

By providing the valve VS', it is possible to use a relatively weak spring 184 for controlling the valve VS. This provides for a more gradual acceleration of the motor shaft 100 with respect to the pump shaft 45. If, however, it is desirable to obtain a more rapid acceleration of the motor shaft 100 under load, it is preferable to provide a heavier spring 184 for the valve 180. Under these circumstances, the valve VS' may be dispensed with, as illustrated in the modified form of the invention shown in Figs. 13 to 18. Under these circumstances, it is also preferable to provide a modified form of valve VS''. This valve is illustrated diagrammatically in Figs. 15 to 18 and is shown as actually constructed in Figs. 13 and 14. The valve comprises a valve core 205 slidably mounted in a cylindrical sleeve 206 extending radially in the member 48. The outward movement of the valve core 205 is controlled by a weight device 207 and a pair of coiled springs 208. The coiled springs are positioned between extensions 209 on the weight device and a ring 210 carried on the periphery of the member 48 and secured thereto by means of pins 211. Preferably a plug 212 is screw threaded in the weight device and has a cylindrical head 213 which slides in a bore in the ring 210 to act as a guide. In this form of the invention, the springs 208 exert sufficient pressure to maintain the valve core 205 in its innermost position illustrated in Figs. 13 and 14 when the shaft 45 is operating at idling speed. As the shaft speed increases, the weight device 207 moves outwardly, thus permitting the valve core 205 also to move outwardly.

The sleeve 206 of the valve VS'' has opening therethrough a large port 214, a restricted port 215 and a port 216, and formed internally thereof an annular groove 217 intermediate the ports 214 and 215. The valve core 205 has a land 218, a narrower land 219 closely adjacent the land 218, and a wide land 220. The land 218, as best seen in Fig. 14, has longitudinal passages 218' running therethrough. In the innermost position of the valve core 205, as shown in Figs. 13 and 14, land 218 closes port 215, and land 220 closes port 216, while land 219 is disposed substantially in the middle of the groove 217. The port 215 and the port 216 through passages 221 and 222, respectively, discharge to the casing 25 and thus are the equivalent of a discharge to the tank or reservoir 164, the fluid finding its way back to the tank in generally the same manner described in connection with passage 200. Port 214 is connected to the conduit 190 by a branch duct 192'. The inner end of the sleeve 206, however, instead of being connected to the conduit 193 through another valve, is connected directly thereto by a passage 199', this passage, as best seen in Fig. 14, being formed in the shaft 45 and communicating with the longitudinal groove 193b.

It is believed readily understood from Figs. 13 and 14, and from the circuit diagrams, particularly Fig. 15, that when the shaft 45 is operating at idling speed the valve core 205 will be in its innermost position and thereby admit fluid to opposite ends of the cylinder 68 so as to maintain the same pressure in both ends of the cylinder, thus permitting the pump wobbler to remain in its neutral or no-stroke position. As the shaft speed increases above idling, the weight device 207 moves outwardly, thus permitting the valve core 205 also to move outwardly progressively to assume the positions shown in Figs. 16 and 17, which illustrate the forward torque multiplying and direct drive positions respectively of the transmission. As the valve core 205 shifts outwardly, the land 219 will, of course, restrict communication with the inner end of the sleeve 206 and may even cut it off completely so as to vary the pressure of the fluid in opposite ends of the cylinder 68 to cause shift thereof in a direction increasing the angle of the pump wobbler.

Having described the valves VS and VS', the modified form of valve VS'' and the fluid conduits or passages controlled by or associated with those valves, the circuit for supplying fluid under pressure will now be described. Inasmuch as the make-up pump MP is driven from the shaft 45 and thus would vary the pressure of the fluid discharged with the speed of rotation of the shaft, the pressure control valve VP is provided. This valve comprises a casing 225 having a valve seat 226 with which cooperates a valve 227 urged to seated position by a compression spring 228. Opening to the casing to one side of the valve seat 226 is a passage 229 communicating at the other end with the pump discharge port 169, while opening to the casing on the opposite side of the valve seat are a pair of ports 230 (see Fig. 6) to which are connected pipes 231 leading and discharging to opposite sides of the tank 164. The valve VP is adjustable to maintain various pressures and herein is adjusted to maintain a pressure of approximately 150 pounds in the passage 229. The pressure so maintained by the valve will hereinafter be referred to as the basic control pressure.

Communicating at one end with the passage 229 is a conduit 232 forming part of the circuit supplying fluid to the wobbler position adjusting means. Included in this circuit is the manual valve VM having a valve casing 233 and a valve core 234 of the cylindrical type projecting at one end from the casing to be manually actuable. The casing 233 has two longitudinally spaced internal annular grooves 235 and 236, and a port 237 midway between the grooves 235 and 236.

The valve core has a reduced portion 238 of such length that when the valve core is in its intermediate or neutral position both of the grooves 235 and 236 are spanned by the reduced portion. Shift of the valve core to the left to the position shown in Fig. 11 will, of course, cut off the groove 236 and, likewise, shift of the valve core to the right to a corresponding extent, namely, to the reverse position shown in Fig. 18, will cut off the groove 235. The core 234 is limited in its movements by a pin 234' acting in a groove 234" (see Fig. 10).

The conduit 232 is connected to the port 237, while connected to communicate with the groove 235 is a conduit 239 formed in part in the member 46 and opening through the member to communicate with the annular groove 191 formed in the shaft 45 and with which the conduit 190 is in communication. Similarly, there is in communication with the groove 236 a conduit 240 again partly formed in the member 46 and communicating with the outer annular groove 194 on the shaft 45 which is in communication with the conduit 193. In the actual construction of the manual valve VM, as shown in Figs. 6, 10 and 10a, there is shown a port 241 intended to be connected to tank and a port 242 through which leakage fluid is returned to the tank, and the valve is mounted in the same housing with the accelerator valve VA.

The pump MP also supplies fluid to make up the loss in the main pump and motor circuit. In order that such make-up fluid may always be supplied before the actuating means for the wobbler is supplied, there is interposed in such make-up fluid supply circuit the reducing valve VR. This also serves to maintain the pressure of the make-up fluid constant, while the pressure of the control fluid may be varied by adjustment of the pressure valve VP. The reducing valve VR comprises a casing 244 (formed by end wall 23) having a bore 244' with three longitudinally spaced internal annular grooves 245, 246 and 247. Reciprocable within the casing is a valve core 248 having lands at opposite ends of the valve core. A compression spring 249 urges the valve core toward the groove 247 in which position the portion of the valve core between the lands bridges the grooves 245 and 246, while in the position shown in Fig. 11 the groove 246 is closed. Fluid at the pressure maintained by the valve VP is supplied to the groove 246 through a conduit 250, in the actual construction taking the form of a passage communicating directly with the passage 229. Fluid under reduced pressure is discharged from the valve casing through a conduit 251 which, as best seen in the diagrammatic views, Figs. 11 and 15 to 18, terminates at one end in branches communicating with the grooves 246 and 247, and communicating at the other end with an annular groove 252 formed internally of the member 31. In the actual physical construction, the conduit 251 takes the form of bores 251a formed in the sleeve 46 and the closure member 168. From the groove 252 a conduit 253 leads to the motor block 29 where it discharges through a strainer 254 and thence through a pair of branch passages through check valves 255 to the motor valve chamber at a point outwardly of the rim 121 of the valve and also at a point inwardly of the rim 121. Inasmuch as the casing 25 rotates at times, the conduit 253 in actual construction is composed of a passage 253a in the member 31 communicating at one end with the groove 252 therein, and at the other end with a passage 253b formed in the closure 26, the conduit being completed by similar passages formed in each of the segmental portions 27, 28 and 29 going to make up the casing 25 and, of course, registering with one another.

The valve VR functions to maintain the pressure in conduit 251 at a constant value determined by the spring 244 regardless of changes of the pressure of the fluid supplied to the valve VR through conduit 250. As indicated, the upper end of the valve core 248 is subject to the pressure of the fluid in conduct 251, a branch of which connects with the upper groove 247. If the pressure in conduit 251 drops below the value for which the valve VR is designed to operate, then spring 244 raises the valve sufficiently to permit fluid to flow from conduit 250 through groove 245, along the reduced portion of the valve 248 and through groove 246 to the lower end of conduit 251, thus raising the pressure in conduit 251 and also in the upper groove 247. The position of the valve is therefore kept in balance between the pressure acting on the upper end of the valve and the spring 244. When the transmission is shut down and the spring 244 moves the valve to its extreme top position, a fluid passage is left open from conduit 250 to conduit 251 through annular grooves 245 and 246 and along the reduced portion of the valve 248. Thus when the transmission is again placed in operation, make-up fluid is immediately supplied to conduit 251 through valve VR, and since the valve VR is generally set at a pressure lower than the setting of valve VP, the make-up circuit is up to its full pressure before the control circuit is up to its full pressure.

The fluid supplied by the make-up pump MP also actuates the brake actuating means, such fluid being under the control of the brake applying valve VBA, the brake release valve VBR and the accelerator pedal actuated valve VA. The valve means VBA includes a valve core 260 mounted in a valve casing 261 forming part of the box 143 and connected to a friction shoe 262 by means of a link 263. The friction shoe is in constant engagement with the cylindrical periphery of the motor cylinder block 29 and is held in such frictional engagement by means of a coiled spring 264. The casing 25 is enabled to rotate sufficiently to actuate the valve core 260 because of the support of the bell crank levers 141 and 142 on the slidably mounted bars 155, as previously described.

The casing 261 has a bore 266 and three longitudinally spaced annular grooves 267, 268 and 269. The core 260 has reduced portions 270 and 271 so that in the position illustrated in Fig. 11 the grooves 268 and 269 are bridged, while when the core is shifted to the right to the position shown in Fig. 15 the grooves 267 and 268 are bridged.

The brake release valve VBR has a casing 275 also formed as a part of the box 143. Extending longitudinally of the casing is a bore 276 in which is reciprocable a valve core 277 of the cylinder type which is constantly urged in one direction by a compression spring 278. The bore has an annular internal groove 279 at the end opposite the spring 278 and intermediate its ends three longitudinally spaced grooves 280, 281 and 282. The valve core 277 has a reduced portion 283 so positioned and proportioned that it bridges the grooves 281 and 282 in one position while blocking the groove 280, while in another position it bridges the grooves 280 and 281 blocking groove 282. A port 284 opening to the groove 279 is never blocked but is at all times free to supply fluid to the end of the bore for acting on the end of the valve core counter to the action of the spring 278. A pin 285 limits the shift of the core 277 under the influence of fluid pressure supplied through port 284.

The accelerator pedal actuated valve VA, as previously stated, is enclosed in the same housing with the manual valve VM and is formed by a second bore 287 in the casing 233. One end of the bore (see Fig. 10) is in communication with the adjacent end of the bore of the manual valve, to be in communication with tank through the port 241. Reciprocable in the other end of the bore is a valve core 288 connected by a link 289 to the accelerator pedal AP. The bore 287 has two longitudinally spaced annular grooves 290 and 291, while the valve core 288 has a reduced portion of considerable length so as to bridge the grooves 290 and 291 through the full range of operation of the accelerator A, such range being considered one position. The valve core 288 has an additional position, namely, the one which it assumes when the accelerator pedal moves to its pre-idle position, shown in Fig. 15, in which position the groove 290 is blocked while the groove 291 is in communication with the tank.

The various valve means just described are connected in circuit as follows: A conduit 295 communicates at one end with the passage 229 and communicates at the other end with the groove 269 of the valve VBA. Fluid may also be supplied to the brake applying valve through a conduit 297 which communicates at one end with the conduit 240 and at the other end with the groove 267. The remaining groove 268 of the brake applying valve is connected by a conduit 298 to the groove 290 of the valve VA. A conduit 299 communicates at one end with the groove 291 of the valve VA and at its other end forks with one branch 300 communicating with the port 284 and the other branch 301 discharging to one end of the cylinder 154. A branch 302 of the conduit 295 communicates with the groove 280 of the brake release valve. The groove 281 of that valve is by a conduit 303 connected to the remaining end of the cylinder 154 and groove 282 is by condut 304 connected to the tank. The conduits just described are in whole or in part formed by passages in the housing 20 (partially shown in Figs. 6 to 8) and completed by pipes not shown except in the diagrammatic views.

The circuit for the modified form of brake actuating means is the same from a functional standpoint as that just described, and is even substantially the same from a physical standpoint. With the modified form of brake actuating means, the branch 301 of the conduit 299, instead of going to one end of the cylinder, discharges to the middle of the cylinder 154', and conduit 303 forks to provide branches 303' and 303" communicating with the ends of the cylinder 154'. Because of this exact functional similarity and the great physical similarity, the same reference characters have been employed in both Fig. 11 and Figs. 15 to 18, except where there was an actual departure, in which case, whenever possible, the same character plus a prime was employed to show the relationship. The figures have also been referred to regardless of the form of invention illustrated to show the various positions of the valves.

In order to make more readily understandable a feature of this invention, as well as the improved operation of the transmission resulting from this feature, there is shown in Fig. 19 an enlarged diametrical sectional view of the wobbler in its position of maximum pump displacement and the positions of the pistons under that condition, while Figs. 20 and 21 are diagrammatic views showing the point of contact of the pistons with the wobbler, respectively, with the wobbler in its maximum stroke position, and in a very small stroke position, that is, making about a 6° angle with the normal to shaft 45. In the discussion to follow, as well as wherever used in the claims, "upper half" of the wobbler refers to the upper half as viewed in Fig. 19, that is, the half of the wobbler which extends forwardly of its pivot point with respect to the pistons, and is thus that half on which the reaction of the pistons is effective to return the wobbler to its neutral or zero position. Likewise, "lower half" will refer to the half of the wobbler below its pivot point and rearwardly of its pivot point as viewed in Fig. 19. "Wobbler arm" will be employed to refer to the distance above or below the pivot for the wobbler at which a piston contacts the wobbler. "Force differential" is the difference in effectiveness due to the longer "wobbler arm" or moment arm, of the pistons acting on the "upper half" of the wobbler over those acting on the "lower half."

It is inherent in wobbler type pump structures that the reaction of the pistons tends to return the wobbler to neutral or zero position, this being due to the increased length of the wobbler arm of the pistons acting on the upper half of the wobbler with respect to those acting on the lower half. This relatively large force acting to return the wobbler to neutral position varies with the angular position of the wobbler and also with the construction of the wobbler and the pistons. Herein the wobbler and the pistons are so designed that the force differential acting to return the wobbler to neutral position is so graduated for the different angular positions of the wobbler that in conjunction with the design of the remainder of the transmission the total force acting on the wobbler is substantially equal at all times. To that end, the ends of the pistons 53 are, as best seen in Fig. 19, rounded, while the surface of the wobbler contacted by the ends of the pistons 53, that is, the surface 59 of the outer ring 56, is also given a convex curvature in radial section.

In a device such as disclosed herein, it has been found to take approximately 3500 pounds per square inch pump output pressure to accelerate satisfactorily under load, whereas, to operate in a 1:1 ratio at full load requires approximately 1000 pounds per square inch pump output pressure. In other words, the per square inch pump pressure for starting is about three and one-half times the pump pressure required to operate at a 1:1 ratio under load. In view thereof, the surface 59 of the wobbler is given a convex curvature so that the force differential tending to restore the wobbler to neutral position does not increase with an increase in the angular position of the wobbler to the extent of such increase with a flat surface on the wobbler. More particularly, the wobbler and the pistons are given such curvature as to result in the pistons having the points of contact with the wobbler illustrated in Figs. 20 and 21, these figures, as previously mentioned, representing the position of the wobbler at 24° and 6° respectively. It will be seen from reference to Fig. 21 that the wobbler arms Wa, Wb, Wc and Wd for the pistons 53a to 53d, respectively, acting on the upper half of the wobbler are longer than the wobbler arms Wa' to Wd', respectively, of the correspondingly positioned pistons 53a' to 53d' acting on the lower half of the wobbler. The net effect, the difference in the length of the wobbler arms varying somewhat between different pairs of pistons, is that the effectiveness of the pistons acting on the upper half of the wobbler at a 6° angle is about 7% greater than that of the pistons acting on the lower half of the wobbler. Reference to Fig. 20 will disclose that the differences in the lengths of the wobbler arms Wa to Wd over the wobbler arms Wa' to Wd' are greater, with the net result such that the effectiveness of the pistons acting on the upper half of the wobbler is approximately 25% greater than that of the pistons acting on the lower half. It will thus be seen that the force differential with the wobbler at 24° is about three and one-half times that when the wobbler is at 6°. It is to be understood, of course, that this same relationship holds true for all angular positions of the wobbler, giving a substantially straight line relationship.

It is believed readily seen, therefore, that with the pump output pressure at a 1:1 ratio of the transmission, two-sevenths of the pump output pressure at starting, i. e., with the wobbler at 6°, and with the force differential when the transmission is operating at a 1:1 ratio, that is, with the wobbler at 24°, three and one-half times that at 6°, the total resultant pressure on the wobbler will be the same for both conditions of operation. Since the pump pressure varies substantially uniformly from 3500 pounds to 1000 pounds as the pump goes from minimum to maximum displacement and since, as previously stated, the force differential varies substantially directly as the angular position of the wobbler increases, the total resultant pressure on the wobbler will be substantially the same throughout the entire range of operation of the transmission. This uniformity of total pressure permits the use of small diameter pistons and above all permits accurate and proper control of the transmission under the constant pressure supplied to the cylinder 68.

Having described the construction of the transmission and its control means, the operation thereof will now be described briefly to render the invention more readily appreciated by a correlated statement of the functions of the various parts. In describing the operation, reference will primarily be made to the circuit diagrams of Figs. 15 to 18, showing the modified construction. Let it be assumed that the pump shaft 45 is rotating at idling speed in a clockwise direction, as viewed from the left in those figures, and that the manual valve VM is in its neutral position. Under those circumstances, the various valves and fluid actuated control devices will be in the positions shown in Fig. 15. More particularly, with the manual valve VM in its neutral position, control fluid is supplied to both grooves 235 and 236 and thus is supplied to both ends of the cylinder 68 at the same pressure. The cylinder 68 will therefore place the pump wobbler in its no-stroke position, with the result that though the pump is being driven no fluid is being discharged to the motor M. The fluid pressure in the cylinders of both the pump and the motor, as well as in the passages of the valve structure, is that of the make-up fluid determined by the adjustment of the pressure reducing valve VR. The speed responsive valve VS" is not actuated and thus is in its innermost position and would in any event have no influence so long as the manual valve is in its neutral position. The accelerator valve VA now connects the conduit 299 with the tank or reservoir, thereby relieving the pressure between the pistons 153' of the brake actuating device, as well as the pressure tending to shift the core of the brake release valve VBR. Under those circumstances, the brake band 40 is released.

To condition the transmission for forward drive, the manual valve VM is shifted to its forward position shown in Fig. 16. In that position, groove 236 no longer receives control fluid from the make-up pump and only groove 235 receives such control fluid. The pressure of the control fluid is thus transmitted through the conduits 239 and 190 to the left hand end of the cylinder 68. This same full control pressure is also transmitted to the right hand end of cylinder 68 through the branch duct 192', valve VS", past land 219 and passages 218' in land 218 (see Fig. 16a), conduit 199', and conduit 193, the valve VS" while in its inner position not functioning to reduce the pressure. Thus the cylinder 68 and hence the wobbler of the pump remain in no-stroke position, even though the manual valve has been shifted to forward position, until the operator accelerates the speed of rotation of the shaft 45.

As the accelerator pedal AP is depressed, it first shifts the core of the accelerator valve VA to the position shown in Fig. 16 before it engages and actuates the accelerator A. By such shift of the accelerator valve, the circuit is conditioned to apply the brake 40 as the transmission begins to operate, and the casing 25 tends to rotate under the counter torque, thereby shifting valve VBA, such application of the brake occurring in the following manner: Control fluid from the make-up pump flows through conduit 295, the brake applying valve VBA (grooves 269 and 268 now being bridged), conduit 298, the accelerator valve (grooves 290 and 291 now being bridged), conduit 299 and its branches 300 and 301, respectively, to the end of the bore in the brake release valve VBR and to the midpoint of the cylinder 154'. Valve core 277 is shifted to the position shown in Fig. 16, thereby blocking groove 280 and bridging grooves 281 and 282 serving to connect the ends of the cylinder 154' to the tank, and thus enabling the pressure between the pistons 153' to separate the pistons and apply the brake band 40.

With further depression of the accelerator pedal, the speed of rotation of the shaft 45 is increased and, as a result the speed responsive valve VS" shifts outwardly under the influence of centrifugal force and the pressure of the fluid from passage 199' (Figs. 16 and 16a) acting on the inner end of the valve core 205. With the initial outward shift, (see Fig. 16a) the land 219 of the valve core restricts the communication between conduits 190 and 193 through the valve VS" and at the same time the restricted port 215 is opened, resulting in a differential in pressure in the opposite ends of the cylinder 68. As the land 219 moves increasingly off center with respect to the groove 217, it increasingly acts to reduce the pressure of the fluid flowing to the end of the valve bore. Thus, the pressure of the fluid flowing to conduit 193 is decreased and also the tendency to shift the valve outwardly diminishes until the valve is completely under the control of centrifugal force. This force alone is never sufficient to shift the valve to the limit of its outward movement. In Figs. 16 and 16a, the valve core is, for exemplary purposes, shown in an intermediate position where it just cracks the passage through the valve. The left hand end of the cylinder now will be at the full control pressure while the right hand end will be at a reduced pressure, resulting in a shift of the cylinder 68 to the left to the position shown in Fig. 16. The pump will now discharge fluid to the motor M tending thereby to drive the motor M and at the same time setting up a reaction torque in the casing 25. This reaction torque is in the direction indicated by the arrow in Fig. 16 and thus through the shoe 262, and the limited movement of the bell crank levers shifts the brake applying valve VBA to the left to the position shown in Fig. 16, thereby making possible the application of the brake previously described. With the casing 25 now held against rotation, the shaft 100 of the motor will be driven, the torque of the shaft 45, of course, being multiplied. The exact position of the pump wobbler will, of course, be dependent upon the pressure differential in the cylinder 68, which is a function of the speed of rotation of shaft 45 and upon the load on the transmission, since the reaction of the pistons, as previously more fully described, is such as to return the wobbler to its no-stroke position. The transmission will thus automatically adopt that adjustment which will enable it to carry the load.

As the core of the speed responsive valve VS" continues to shift outwardly under increased speeds of the shaft 45, it completely prevents communication between the conduits 190 and 193 (this occurring at about 1200 R. P. M.), thereby producing a still greater pressure differential in the opposite ends of the cylinder 68. This position of the valve VS" is shown in Figs. 17 and 17a, and the result is that the left hand end of the cylinder 68 is under the full pressure of the control fluid while the right hand end is at no pressure, being connected with the tank through the port 215. The cylinder 68 thus tends to shift to its extreme left position, shown in Fig. 17, which is the maximum stroke position of the pump wobbler. This position, of course, is also dependent upon the load on the transmission. As the torque on the shaft 45 required to drive the load decreases, the reaction of the pistons 53 on the wobbler decreases, permitting increased tilt of the wobbler until maximum stroke of the pistons 53 is obtained. As the displacement of the pump increases, the speed of rotation of the motor increases and the torque of the motor shaft decreases relatively to the torque applied to the pump shaft until the motor torque is equal to the applied torque. When this balance is reached, the reaction torque on the casing 25 produced by the pump equals that produced by the motor and further increase in the speed of the pump shaft would cause the pump torque to overcome the motor reactive torque, with the result that the casing 25 now tends to rotate with the shafts, which is in the direction indicated by the arrow in Fig. 17.

The tendency of the casing 25 to rotate in the same direction with the shafts 45 and 100 is permitted, first, by the play provided for in the mounting of the bell crank levers 141' and 142'. This initial rotation shifts the core of the brake applying valve VBA to the right to the position shown in Fig. 17. In this position, the grooves 267 and 268 are bridged, thereby relieving the pressure between the pistons 153' and in the end of the bore 276 of the brake release valve VBR. The connection to tank is effected through the conduit 299, valve VA, conduit 298, valve VBA, conduit 297, conduit 240, a part of conduit 193, conduit 199', port 215 of the valve VS", and passage 221. Relief of the pressure in the end of the bore of the brake release valve VBR permits the spring 278 to shift the valve core to the position shown in Fig. 17, in which position the grooves 280 and 281 are bridged. As a consequence, fluid from the make-up pump flows through the conduit 295, conduit 302, valve VBR, conduit 303, and its branches 303' and 303" to the ends of the cylinder 154'. This releases the brake, permitting the casing 25 to rotate with the pump and motor, with the result that the transmission is locked to operate substantially as a unit in a 1:1 ratio. During operation under these circumstances, there is substantially no flow of fluid from the pump to the motor or vice versa, the force being transmitted through substantially static columns of fluid.

If it is desired to place the transmission in reverse, the manual valve MV is shifted to its reverse position shown in Fig. 18. In this position, the groove 235 is blocked and control fluid is supplied only to the groove 236. Full control fluid pressure is now applied to the right hand end of the cylinder 68, being transmitted through the conduit 240 and the conduit 193. This pressure is, through the conduit 199', (see Fig. 18a) also applied to the inner end of the core 205 of the valve VS". This pressure added to the centrifugal force moves the valve core outwardly beyond its direct drive position to open port 216 which leads to the tank. The left hand end of cylinder 68 is thus through the conduit 190 and branch duct 192' and valve VS" connected to the tank permitting the cylinder 68 to be shifted to the limit of its position to the right. This reverses the tilt of the wobble plate, thereby causing the pump to operate the motor in reverse direction. Under these conditions, the reaction torque is in the direction indicated by the arrow in Fig. 18, and consequently the core of the brake applying valve is shifted to its right position, shown in Fig. 18. The brake release valve VBR is now shifted and pressure fluid is supplied between the pistons 153' to apply the brake, the same as previously described in connection with the operation of the transmission in forward torque multiplying condition. The control fluid is, under these circumstances, derived through the conduit 297, conduit 240, the manual valve, and conduit 232. The fact that the right hand end of cylinder 68 is connected to tank through port 215 has no influence because the port is so restricted.

I claim as my invention:

1. A hydraulic transmission comprising, in combination, a driving element, a driven element, a variable displacement pump coupled to said driving element including means responsive to an increase in torque in the transmission tending to decrease pump displacement, a motor coupled to said driven element and connected in hydraulic circuit with said pump, hydraulic means operable to urge said pump toward increased displacement, control fluid supply means for said hydraulic means including valve means, and centrifugal means responsive to the speed of rotation of said driving element for actuating said valve means and operable with an increase in the speed of rotation of said driving element to actuate the valve means and cause said fluid to operate said hydraulic control means in a manner increasing pump displacement.

2. A hydraulic transmission comprising, in combination, a driving element, a driven element, a variable displacement pump coupled to said driving element, a motor coupled to said driven element and connected in hydraulic circuit with said pump, a piston and cylinder device for varying the displacement of the pump, means for supplying fluid to the opposite ends of said piston and cylinder device including valve means exercising control over the pressures in opposite ends of said piston and cylinder device, and means responsive to the speed of rotation of said driving element for actuating said valve means to cause increase in the pump displacement with increase in speed of the driving element.

3. A hydraulic transmission comprising, in combination, a driving element, a driven element, a variable displacement pump coupled to said driving element, a motor coupled to said driven element and connected in hydraulic circuit with said pump, a piston and cylinder device for varying the displacement of the pump, said device assuming a position placing the pump in no-stroke condition when opposite ends of the device are under the same fluid pressure, means for supplying fluid to said piston and cylinder device including valve means controlling the relative pressures of the fluid in opposite ends of said piston and cylinder device, and means responsive to the speed of rotation of said driving element for actuating said valve means and operable with increase in the speed of rotation of said driving element to actuate said valve means increasingly to unbalance said pressures to increase displacement of the pump.

4. A hydraulic transmission comprising, in combination, a driving element, a driven element, a reversible and variable displacement pump coupled to said driving element, a motor coupled to said driven element and connected in hydraulic circuit with said pump, hydraulic means exercising control over the displacement of said pump, and means for supplying control fluid to said hydraulic means comprising a pump, a circuit leading from said pump to opposite sides of said hydraulic means, a manually actuable valve operable to direct fluid to said hydraulic means to adjust the same for zero pump displacement and to condition said hydraulic means for adjustment of the pump for forward or reverse operation, and means responsive to the speed of rotation of said driving element exercising final control over the fluid supplied to said hydraulic means to cause increased pump displacement of said first mentioned pump upon increase of speed of the driving element.

5. A hydraulic transmission comprising, in combination, a driving element, a driven element, a variable displacement pump coupled to said driving element, a motor coupled to said driven element and connected in hydraulic circuit with said pump, a piston and cylinder device connected to exercise control over the displacement of the pump, said piston and cylinder device operating with equal fluid pressures in its opposite ends to adjust the pump to a no-stroke condition, and means for supplying control fluid to opposite ends of the piston and cylinder device including a pump driven by said driving element, a circuit leading from said pump to opposite ends of the piston and cylinder device, a valve for maintaining a predetermined discharge pressure of said last mentioned pump, a manual valve in the circuit operable to direct fluid to shift the piston and cylinder device to neutral position and operable in other positions to direct fluid under pressure to one or the other end of the piston and cylinder device, valve means connected in the circuit, and means responsive to the speed of rotation of said driving element actuating said last mentioned valve means to control the relative pressure in opposite ends of said piston and cylinder device to cause increased pump displacement of said first mentioned pump upon increase of speed of the driving element.

6. A hydraulic transmission comprising, in combination, a driving element, a driven element, a variable displacement pump coupled to said driving element, a motor coupled to said driven element and connected in hydraulic circuit with said pump, a piston and cylinder device for varying the displacement of the pump, said device assuming a position placing the pump in no-stroke condition when opposite ends of the device are under the same fluid pressure, and control fluid supply means for said piston and cylinder device including a pressure generating means, a manually actuable valve having a position for directing fluid to both ends of said piston and cylinder device, a different position for directing the control fluid to one end of said piston and cylinder device and a still different position for directing the control fluid to the other end of the piston and cylinder device, valve means controlling communication between opposite ends of said piston and cylinder device, and means operable in response to the rotative speed of said driving element controlling said last mentioned valve means increasingly to restrict communication as the rotative speed of said driving element increases above its normal idling speed to cause increased pump displacement of said first mentioned pump upon increase of speed of the driving element.

7. A hydraulic transmission comprising, in combination, a driving element, a driven element, a variable displacement pump coupled to said driving element, a motor coupled to said driven element and connected in hydraulic circuit with said pump, a piston and cylinder device for varying the displacement of the pump, said device assuming a position placing the pump in no-stroke position when opposite ends of the device are under the same fluid pressure, and control fluid supply means for said piston and cylinder device including a pressure generating means, a circuit including a first conduit leading to one end of said device and a second conduit leading to the other end of said device, a manually actuable valve having a position for directing fluid to both ends of said piston and cylinder device to place the pump in no-stroke position regardless of the speed of rotation of said driving element, a forward position for directing the pressure fluid through said first conduit to an end of the piston and cylinder device tending to adjust the pump to forward pump operating condition, a reverse position for directing fluid through said second conduit to the other end of said piston and cylinder device for adjusting the pump to reverse operating condition, a passage connecting opposite ends of said piston and cylinder device, a restricted discharge passage, an unrestricted discharge passage, valve means controlling said connecting passage and said restricted and unrestricted discharge passages, means responsive to the speed of rotation of said driving element controlling said last mentioned valve means at the idling speed of the driving element to close both discharge passages while leaving the interconnecting passage open to retain the pump in no-stroke position even though the manual valve means is shifted to direct fluid to one end only of said piston and cylinder device, and with increases in the rotative speed of the driving element to restrict the interconnecting passage and to connect the restricted discharge passage with said second conduit when the manual valve is shifted to forward position and completely to close the interconnecting passage and connect the unrestricted discharge passage with said first conduit with any increase in rotative speed of said driving element above idling speed when the manual valve is shifted to reverse position.

8. A hydraulic transmission comprising, in combination, a driving element, a driven element, a variable displacement pump coupled to said driving element, a motor coupled to said driven element and connected in hydraulic circuit with said pump, hydraulic means exercising control over the displacement of said pump, a constant pressure source of control fluid for said hydraulic means, and means responsive to the speed of rotation of the driving element for controlling the effectiveness of the control fluid on said hydraulic means.

9. A hydraulic transmission comprising, in combination, a driving element, a driven element, a variable displacement pump coupled to said driving element, a motor coupled to said driven element and connected in hydraulic circuit with said pump, hydraulic means exercising control over the displacement of the pump, and means for supplying control fluid to said hydraulic means including means for adjusting the basic pressure of the control fluid, and means responsive to the speed of rotation of said driving element controlling the effectiveness of the control fluid on said hydraulic means.

10. A hydraulic transmission comprising, in combination, a driving element, a driven element, a variable displacement pump coupled to said driving element, a motor coupled to said driven element and connected in closed hydraulic circuit with said pump, hydraulic means exercising control over the displacement of said pump, a common means for supplying control fluid for said hydraulic device and make-up fluid for the pump and motor circuit, means for adjusting the pressure of the fluid from said common means, and valve means for reducing to a desired value part of said control fluid for pressure of the make-up purposes to render the pressure of the make-up fluid independent of changes in the pressure of the control fluid.

11. A hydraulic transmission comprising, in combination, a driving element, a driven element, a variable displacement pump coupled to said driving element, a motor coupled to said driven element and connected in closed hydraulic circuit with said pump, hydraulic means exercising control over the displacement of said pump, and means for supplying control and make-up fluid including an auxiliary pump driven by said driving element, valve means for maintaining constant the discharge pressure of said auxiliary pump independently of the speed of rotation of said driving element, said valve means being adjustable to vary the discharge pressure, and a second valve means maintaining constant the pressure of the make-up fluid supplied to the closed pump and motor circuit independently of variations in the discharge pressure of the auxiliary pump.

12. A hydraulic transmission comprising, in combination, a rotatable casing having therein an adjustable and reversible displacement wobbler type pump with a cylinder block carried by the casing and a shaft extending from one end of the casing, a wobbler type motor with a cylinder block carried by the casing and a shaft extending from the other end of the casing, a brake device operable to hold said casing against rotation under reaction torque, and means for adjusting the pump wobbler automatically from zero to maximum displacement of the pump in accordance with the load on the transmission and the speed of the pump shaft.

13. A hydraulic transmission comprising, in combination, a rotatable casing having therein an adjustable and reversible displacement wobbler type pump with a cylinder block carried by the casing and a shaft extending from one end of the casing, a wobbler type motor with a cylinder block carried by the casing and a shaft extending from the other end of the casing, a brake device operable to hold said casing against rotation under reaction torque, means for adjusting the pump wobbler automatically from zero to maximum displacement of the pump in accordance with the load on the transmission, and power operated means for releasing said brake device automatically when the pump input torque exceeds the motor reaction torque.

14. A hydraulic transmission comprising, in combination, a rotatable casing, a pump of the reversible and adjustable wobbler type within said casing having its cylinder block carried by the casing and a shaft projecting outwardly through one end of the casing, a motor of the wobbler type in said casing having its cylinder block carried by the casing and having a shaft projecting through the opposite end of said casing, said pump and motor being in hydraulic circuit, and brake means operating automatically to hold said casing against rotation under reaction torque for either direction of rotation of the motor shaft.

15. A hydraulic transmission comprising, in combination, a rotatable casing, a pump of the wobbler type within said casing having its cylinder block carried by the casing and a shaft projecting outwardly through one end of the casing, a motor of the wobbler type in said casing having its cylinder block carried by the casing and having a shaft projecting through the opposite end of said casing, said pump and motor being in hydraulic circuit, a brake for said casing, means controlling the application or release of said brake, and means responsive to the rotative tendency of said casing governing said brake actuating means.

16. A hydraulic transmission comprising, in combination, a rotatable casing, a pump of the adjustable and reversible wobbler type mounted in said casing having its cylinder block carried by the casing and a shaft projecting outwardly through one end of the casing, a motor of the wobbler type mounted in said casing having its cylinder block carried by the casing and having a shaft projecting through the opposite end of said casing, said pump and motor being in hydraulic circuit, a brake for said casing, actuating means for applying or releasing said brake including hydraulic motor means, means for supplying control fluid to said motor means, and means governing the control fluid supplied to said motor means and operating under tendency of said casing to rotate counter to the motor shaft to apply the brake and under tendency of said casing to rotate with said motor shaft to release said brake for rotation of said casing with said shafts.

17. A hydraulic transmission comprising, in combination, a rotatable casing, a pump of the adjustable and reversible wobbler type mounted in said casing having its cylinder block carried by the casing and a shaft projecting outwardly through one end of the casing, a motor of the wobbler type mounted in said casing having its cylinder block carried by the casing and having a shaft projecting through the opposite end of said casing, said pump and motor being in hydraulic circuit, a brake for said casing, actuating means for applying or releasing said brake including hydraulic motor means of the piston and cylinder type, a means for supplying control fluid to said hydraulic motor means, and means for governing the supply of control fluid including a first valve directly governing the supply of control fluid to one operative end of the piston and cylinder device, and a second valve responsive to the rotative tendency of said casing governing the supply of control fluid to the opposite operative end of said piston and cylinder device and also the supply of control fluid governing the position of said first mentioned valve.

18. A hydraulic transmission comprising, in combination, a rotatable casing having therein an adjustable and reversible displacement wobbler type pump with a cylinder block carried by the casing and a shaft extending from one end of the casing, a wobbler type motor with a cylinder block carried by the casing and a shaft extending from the other end of the casing, means for adjusting the pump wobbler for forward or reverse operation of said pump, a brake device for said casing, and control means for said brake device including means responsive to the directional rotative tendency of said casing operable for either adjustment of the pump wobbler to cause the brake device to be applied when the rotational tendency is counter to the direction in which the motor shaft is being driven and to cause release of said brake device when the rotational tendency is in the same direction as the direction in which the motor shaft is being driven.

19. A hydraulic transmission comprising, in combination, a rotatable casing having therein an adjustable and reversible displacement wobbler type pump with a cylinder block carried by the casing and a shaft extending from one end of the casing, a wobbler type motor with a cylinder block carried by the casing and a shaft extending from the other end of the casing, hydraulic means for adjusting the pump wobbler automatically from zero to maximum displacement and to forward or reverse operation of the pump, means supplying control fluid for said hydraulic means including a manually actuable valve having a forward position in which it is effective to cause forward operation of the pump and a reverse position effecting reverse operation of the pump, a brake device for said casing including piston and cylinder means adapted to be actuated by fluid from said control fluid supply means, and control means including a first valve governing the supply of control fluid to one operative end of said piston and cylinder means, and a second valve responsive to the rotational tendency of said casing governing the supply of control fluid to the other operative end of said piston and cylinder means and the position of said first valve, said second valve being supplied with control fluid directly from the control fluid supply means and under the control of said manual valve to be operable to cause application of said brake device whenever the rotative tendency of said casing is counter to the direction of rotation of said motor shaft and to cause release of said brake device when the rotative tendency is in the same direction as the rotation of said shaft.

20. A fluid transmission comprising, in combination, a rotatably mounted casing, a piston pump device in said casing having a shaft extending from one end thereof, a piston motor device in said casing having a shaft extending from the other end thereof, means including a wobbler for adjusting the stroke of said pump pistons and to reverse the flow of fluid through the pump, fluid channels in said casing connecting the pump and motor, valves driven by the pump and motor shafts for controlling the flow of fluid in said channels, the capacity of the cylinders of the motor being substantially equal to the capacity of the cylinders of the pump when adjusted for maximum stroke so as to obtain substantially a 1:1 ratio between the pump and motor shafts for high speed drive, a piston and cylinder device operable to change the position of said wobbler, means for supplying fluid to said piston and cylinder device, means for controlling said fluid including a valve and speed responsive means carried on said pump shaft effective to move said valve to increase the pump stroke as the speed of the pump shaft increases, a brake effective when applied to hold said casing against rotation, and means for controlling the application of said brake effective to apply the brake when the motor shaft is accelerating and to release the brake automatically as the speed of the motor shaft substantially equals the speed of the pump shaft.

21. In a hydraulic transmission for a vehicle having an accelerator and an accelerator pedal, a rotatably mounted casing, a pump of the wobbler type mounted in one end of said casing and having a part carried by the casing and a shaft projecting through one end of the casing, a motor of the wobbler type mounted in the other end of said casing having a part carried by the casing and a shaft projecting through said end of the casing, said pump and motor being connected in hydraulic circuit, a brake for said casing, and control means for said brake including means responsive to the rotative tendency of said casing to apply or release the brake in accordance with the direction in which the casing tends to rotate, and means operated by the accelerator pedal controlling the time when said means responsive to the rotative tendency of said casing is effective to control the brake.

22. In a hydraulic transmission for a vehicle having an accelerator and an accelerator pedal with the accelerator pedal having a pre-idle position, a rotably mounted casing, a pump of the wobbler type mounted in one end of said casing and having a part carried by the casing and a shaft projecting through one end of the casing, a motor of the wobbler type mounted in the other end of said casing having a part carried by the casing and a shaft projecting through said end of the casing, said pump and motor being connected in hydraulic circuit, a brake for said casing, and control means for said brake including means responsive to the rotative tendency of said casing to apply or release the brake in accordance with the direction in which the casing tends to rotate, and valve means operated by the accelerator pedal rendering said control means effective when the accelerator pedal actuates the accelerator and ineffective when the accelerator is in its pre-idle position.

23. In a transmission, a rotatable casing, a pump and a motor within said casing, a brake for the casing permitting limited initial rotation of the brake with said casing when the brake is applied, and means responsive to such limited rotation of said brake to govern the application of the brake.

24. In a hydraulic transmission, a motor, a variable speed variable displacement pump comprising a cylinder block having a plurality of annularly arranged cylinders formed therein, a piston reciprocable in each of said cylinders, a pump shaft extending axially of the cylinder block, and a wobbler pivotally mounted on said shaft for driving said pistons, said wobbler having an annular surface radially convex for engagement with the pistons curved to produce a force differential of the pistons on the upper and the lower half of the wobbler, which between maximum stroke and minimum stroke of the pistons varies directly as the pump pressure between acceleration of the motor and operation of the transmission in a 1:1 ratio, hydraulically operated means for varying the pump stroke, means for supplying fluid under constant pressure to said hydraulically operated means, and a valve for controlling the supply of said fluid to said hydraulically operated means.

25. In a hydraulic transmission, a motor, a pump comprising a cylinder block having a plurality of annularly arranged cylinders formed therein, a piston reciprocable in each of said cylinders, a pump shaft extending axially of the cylinder block, a wobbler pivotally mounted on said shaft having a surface engaging the pistons for driving said pistons, said transmission operating at one pump pressure when driving a load in a 1:1 ratio of the pump and motor and operating at a pump pressure of approximately three and one-half times the first pressure while accelerating the motor with respect to the pump, said wobbler surface and the ends of said pistons being constructed to produce a force differential of the pistons on the upper and lower half of said wobbler which is three and one-half times as great with the wobbler in maximum stroke position as it is with the wobbler in short stroke position, power operated means for moving the wobbler towards maximum stroke position, and means responsive to the speed of the pump shaft for controlling the action of said power operated means.

26. In a hydraulic transmission, a motor, a pump for driving the motor comprising a cylinder block having a plurality of annularly arranged cylinders formed therein, a piston reciprocable in each of the cylinders and having means projecting at one end from the cylinder, a shaft disposed axially of the block, a wobbler pivotally mounted on said shaft for driving said pistons, hydraulic means for urging said wobbler toward increased stroke position, means for supplying fluid pressure to the said first mentioned means, means responsive to the speed of rotation of said shaft controlling the pressure supplied, and said wobbler having an annular surface, engaging said pistons, convex of a radial curvature producing a uniform total pressure on the wobbler for all angular positions thereof.

27. In a hydraulic transmission, a motor and a pump of the wobbler type for supplying driving fluid to the motor comprising a cylinder block having a plurality of parallel annularly arranged cylinders formed therein, a piston reciprocable in each of said cylinders and having means projecting from one end of the cylinder in all positions of the piston, a shaft, disposed axially of said cylinder block, a wobbler pivotally mounted on said shaft and engaging the projecting means of said pistons for actuating the same, said wobbler having a radially convex surface engaged by the projecting means of said pistons curved to provide a substantially straight line relationship between the angular tilt of the wobbler with respect to a normal to the shaft and the force differential resulting from the pistons acting on the upper and lower halves of the wobbler, hydraulic means for moving the wobbler towards its maximum stroke position and means responsive to the speed of the pump shaft for controlling said hydraulic means to increase the pump displacement with increase in speed of the pump shaft.

28. In a hydraulic transmission, a motor, a variable displacement pump hydraulically connected to said motor and comprising a cylinder block having a plurality of annularly arranged cylinders formed therein, a piston reciprocable in each of said cylinders, a pump shaft extending axially of the cylinder block, and a wobbler pivotally mounted on said shaft for driving said pistons, said wobbler having an annular radially convex surface for engagement with the pistons curved to produce a force differential of the pistons on the upper and the lower half of the wobbler which between maximum stroke and minimum stroke of the pistons varies directly as the pump pressure between acceleration of the motor and operation of the transmission in a 1:1 ratio, power operated means for moving the wobbler toward increased stroke position, and means responsive to the speed of the pump shaft for controlling the action of said power operated means.

GUNNAR A. WAHLMARK.